(12) United States Patent
Hirai et al.

(10) Patent No.: US 6,535,693 B2
(45) Date of Patent: Mar. 18, 2003

(54) PHOTOMETRY DEVICE

(75) Inventors: Isamu Hirai, Tokyo (JP); Yoshikazu Iida, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/784,239

(22) Filed: Feb. 16, 2001

(65) Prior Publication Data
US 2001/0016117 A1 Aug. 23, 2001

(30) Foreign Application Priority Data

| Feb. 17, 2000 | (JP) | 2000-040055 |
| Feb. 17, 2000 | (JP) | 2000-040056 |
| Aug. 3, 2000 | (JP) | 2000-235357 |
| Aug. 8, 2000 | (JP) | 2000-239413 |

(51) Int. Cl.⁷ .............................. G03B 7/00; G03B 7/08
(52) U.S. Cl. ....................................... 396/225; 396/233
(58) Field of Search ................... 396/65, 67, 121, 396/122, 123, 233, 225, 234

(56) References Cited

U.S. PATENT DOCUMENTS 5,596,387 A    1/1997   Takagi
5,710,948 A    1/1998   Takagi
5,987,265 A    11/1999  Iwasaki
6,175,693 B1   1/2001   Iida

FOREIGN PATENT DOCUMENTS

JP    7-84299    3/1995

*Primary Examiner*—Russell Adams
*Assistant Examiner*—Arthur A Smith
(74) *Attorney, Agent, or Firm*—Greenblum & Bernstein, P.L.C.

(57) ABSTRACT

A photometry device for a camera, includes a normal light sensor having spectral sensitivity characteristics close to visual sensitivity characteristics, a plurality of colorimetric sensors having spectral sensitivity characteristics that are different from each other, an exposure amount determining system that determines an exposure amount of an object in accordance with an output of the normal light sensor, a colorimetry system that judges a color of the object in accordance with the outputs of the plurality of colorimetric sensors, and a compensation amount determining system that determines an exposure compensation amount in accordance with the color judged by the colorimetry system. The compensation amount determining system compensates for the exposure compensation amount determined by the compensation amount determining system in accordance with differences among the outputs of the plurality of colorimetric sensors.

27 Claims, 21 Drawing Sheets

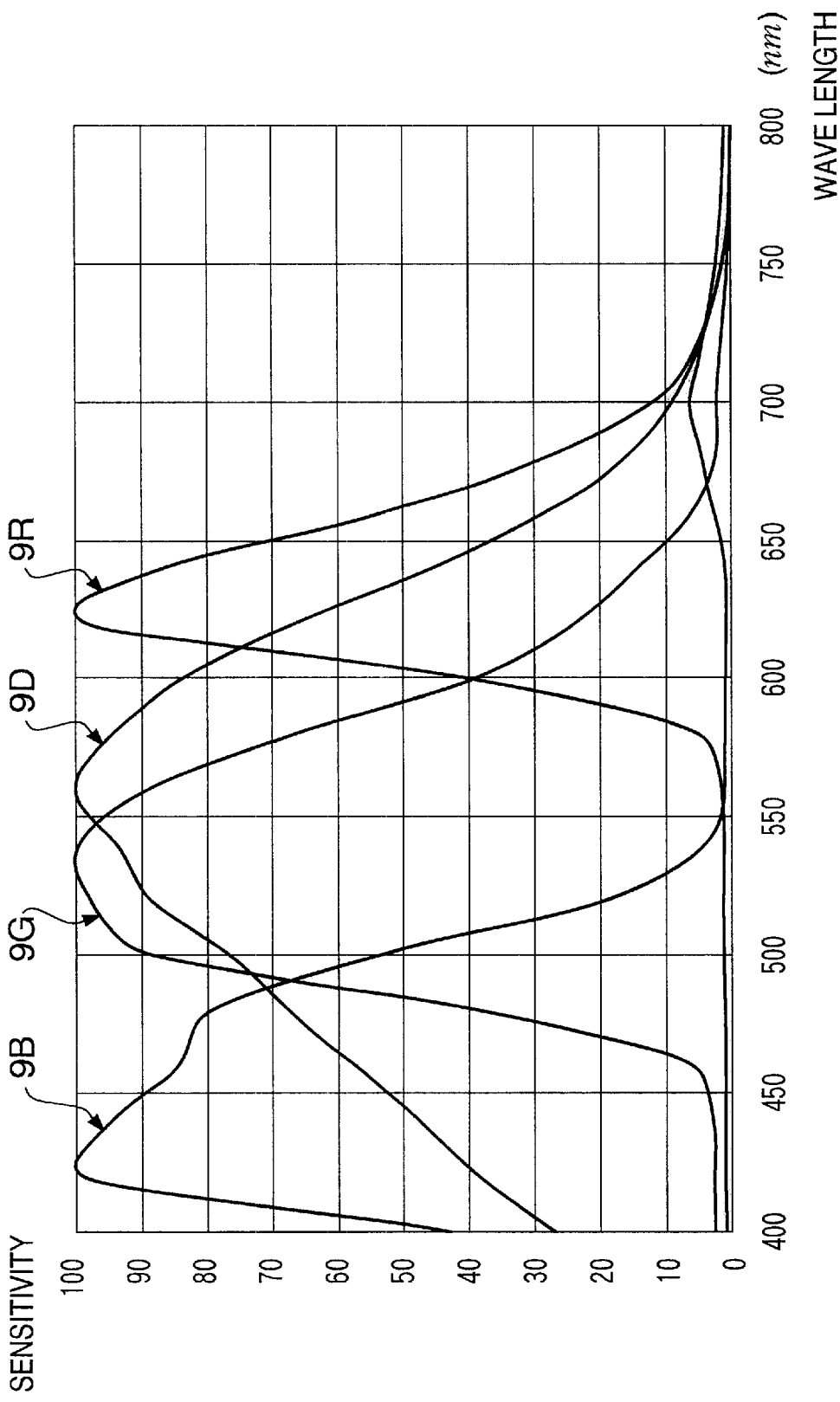

(EEPROM)

|  |  | THvalue | coefficient | CCcoefficient | CCadjustment |
|---|---|---|---|---|---|
| GREEN | g1 | 8 | 3/4 | 0 | 0 |
|  | g2 |  | 3/4 |  |  |
| BLUE | b1 | 8 | 3/4 | 2/16 | 2 |
|  | b2 |  | 3/4 |  |  |
| RED | r1 | 15 | 3/4 | 1/16 | 2 |
|  | r2 |  | 3/4 |  |  |
| MAGENTA | m1 | −40 |  | 0 | 0 |
| YELLOW | y1 | −9 |  | 1 | −4 |
| CYAN | c1 | −40 |  | 0 | 0 |

FIG.17

PHOTOMETRY DEVICE

BACKGROUND OF THE INVENTION

The present invention relates to a photometry device applicable to an SLR (Single Lens Reflex) camera, and more particularly to a photometry device with which exposure errors due to a difference of reflectivity of objects having different colors can be compensated.

Recently, in most cameras, reflection type photometry devices are employed. The reflection type photometry device receives the light, which is reflected by an object and passed through an observing optical system of a camera, using a light receiving element, determines the brightness of the object based on the output of the measured value, and then calculates the exposure value of the camera based on the measured brightness. However, this type of photometry device cannot detect the color of the object because of its structure. Accordingly, in such a device, the reflectivity of an object is generally assumed to be 18% and the exposure parameter is determined on this assumption. Therefore, regarding a whitish object whose reflectivity is greater than 18%, the determined brightness is greater than the actual brightness. If the camera controls an exposure operation based on the determined exposure value, the object is under exposed. Regarding a dark object whose reflectivity is less than 18%, such an object is over exposed in order to increase an exposure value. The difference of the reflectivity of the object may also occur depending on the color of the object. For example, when the color of an object is yellow, the reflectivity may be up to 70%. In such a case, if the standard reflectivity is assumed to be 18%, the exposure value is approximately 2 Ev lower than necessary. If the object color is blue, the reflectivity is approximately 9%. In this case, the object is over exposed by approximately 1 Ev greater than necessary.

Therefore, in the conventional photometry device, the photographer is required to guess the reflectivity of the object. Then, based on the reflectivity determined by the photographer, the exposure is controlled such that, if the object is a whitish or yellowish one having a relatively high reflectivity, it is to be overexposed, and if the object is a blackish or bluish one having a relatively low reflectivity, it is to be underexposed. With this operation, the above-described defects may be solved. However, to accurately guess the reflectivity of the object and control the exposure can be done only by experienced and skilled photographers. It is impossible to have all the photographers do such an operation. Further, it is not preferable that a manual operation of the photographer is required for exposure. Further, if such a manual operation is required, the camera becomes unsuitable, as the recent trend is for automatic photographing.

Recently, there is suggested a camera provided with a photometry device which divides the light from object into three-primary color components, and determines the color of the object based on the photometry outputs of respective color components. Since the color of the object is automatically determined, the above-described photographer's operation becomes unnecessary. However, depending on the color purity of the object, the determined compensation value may not precisely correspond to the actual color of the object. For example, given that the object color is blue, the blue purity could fall in various conditions. That is, the blue purity of the object may be relatively high, or the purity may be relatively low and the light from the object may include red and/or green components as well. Since the blue purity could have various levels even if the object color is determined to be blue, it is not reliable if the compensation value corresponding to pure blue is determined to be the compensation value for such an object. That is, if the compensation value corresponding to pure blue object is used for the object whose blue purity is relatively low, the compensation value may cause over-exposed condition. On the contrary, if the compensation value is determined based on an object having relatively low blue purity, the pure blue object may be under-exposed.

Furthermore, when the above-described compensation is applied, inappropriate compensation values may also be obtained depending on the contrast of the object. That is, a bright portion of the object having a higher contrast has more influence on the compensation value than a bright portion of an object having a lower contrast. For example, when a portion of the object has a relatively high reflectivity and another portion has a relatively low reflectivity, if the exposure compensation is applied based on the portion having the low reflectivity, the portion having the high reflectivity may be over-exposed. In such a case, it is difficult to determine an appropriate exposure for an entire object.

SUMMARY OF THE INVENTION

It is therefore an object of the invention to provide an improved photometry device with which appropriate exposure values can be obtained regardless of difference of reflectivity, color purity and contrast of focused objects.

According to an aspect of the invention, there is provided a photometry device for a camera, which includes a normal light sensor having spectral sensitivity characteristics close to visual sensitivity characteristics, a plurality of colorimetric sensors having spectral sensitivity characteristics that are different from each other, an exposure amount determining system that determines an exposure amount of an object in accordance with an output of the normal light sensor, a colorimetry system that judges a color of the object in accordance with the outputs of the plurality of colorimetric sensors, and a compensation amount determining system that determines an exposure compensation amount in accordance with the color judged by the colorimetry system. The compensation amount determining system compensates for the exposure compensation amount determined by the compensation amount determining system in accordance with differences among the outputs of the plurality of colorimetric sensors.

With this configuration, appropriate exposure values can be obtained regardless of the difference of the reflectivity and color purity of objects.

Optionally, the compensation amount determining system may compensate for the exposure compensation amount such that the exposure compensation amount is made greater when the differences are greater.

In a particular case, the normal light sensor may include a normal light photometry sensor, the spectral sensitivity characteristic of which has a peak sensitivity at a wavelength within a range from approximately 500 nm through 600 nm, and the plurality of colorimetric sensors may include a blue light photometry sensor for metering blue light component, a green light photometry sensor for metering green light component, and a red light photometry sensor for metering red light component.

Further optionally, the compensation amount determining system calculates a difference between an output of one of the plurality of colorimetric sensors, and an average of outputs of the other of the plurality of colorimetric sensors, and the compensation amount determining system compensates the exposure compensation amount in accordance with the difference.

In the above case, the compensation amount determining system may compensate for the exposure compensation amount such that the larger the difference is, the greater the exposure compensation amount is.

Still optionally, each of the plurality of colorimetric sensors may have a light metering surface divided into a plurality of photometry areas, and the compensation amount determining system may determine the exposure compensation amount in accordance with the outputs at least one of the plurality of photometry areas.

In the above case, at least one of the plurality of photometry areas may include a center of an object subjected to be metered.

Alternatively, at least one of the plurality of photometry areas may overlap an area subjected to a distance measuring.

Optionally, the green light sensor is used as both the normal light sensor and the colorimetric sensor.

Further optionally, the normal light sensor may have a light metering surface divided into a plurality of photometry areas, the compensation amount determining system obtains a difference between a maximum output and a minimum output outputted from the plurality of photometry areas of the normal light sensor as a contrast value, the exposure compensation amount being compensated in accordance with the contrast value.

In the above case, compensation amount determining system may compensate for the exposure compensation amount such that the larger the contrast value is, the smaller the exposure compensation amount is.

According to another aspect of the invention, there is provided a photometry device for a camera, which is provided with a photometry system that divides a photographing area into a plurality of photometry areas and performs a photometry operation with respect to each of the plurality of photometry areas, a colorimetry system that performs a colorimetry operation with respect to at least one of the plurality of photometry areas, an exposure amount determining system that determines an exposure amount of an object in accordance with outputs of the photometry system, a compensation amount determining system that judges a color of the object in accordance with the output of the colorimetry system and determining an exposure compensation amount in accordance with the judged color, and an exposure compensation amount compensating system that compensates for the exposure compensation amount in accordance with the judged color and a difference between an output of the photometry system corresponding to the at least one of the photometry areas for which the colorimetry operation is performed and outputs of the photometry system corresponding to photometry areas adjacent to or surrounding at least one of the photometry areas.

Optionally, the at least one of the plurality of photometry areas may include a photometry area corresponding to a center of the photographing area.

Further, at least one of the plurality of photometry areas includes a point subjected to a distance measuring for focusing.

Still optionally, the exposure compensation amount compensating system may lower the exposure compensation amount if the judged color is a color having a high reflectivity, and if the output of the photometry system with respect to the photometry areas adjacent to or surrounding the at least one photometry area is low relative to the output of the photometry system with respect to the at least one photometry area. In a particular case, the exposure compensation amount is set to zero.

Optionally or alternatively, the exposure compensation amount compensating system may lower the exposure compensation amount if the judged color is a color having a low reflectivity, and if the output of the photometry system with respect to the photometry areas adjacent to or surrounding the at least one photometry area is high relative to the output of the photometry system with respect to the at least one photometry area. In a particular case, the exposure compensation amount is set to zero.

Alternatively, the exposure compensation amount may be set to zero by the exposure compensation amount compensating system if the judged color is red, and if a difference between the output of the photometry system with respect to the photometry areas adjacent to or surrounding the at least one photometry area, and the output of the photometry system with respect to the at least one photometry area is greater than a first predetermined value.

In this case, the exposure compensation amount is set to zero by the exposure compensation amount compensating system if the judged color is blue, and if the difference between the output of the photometry system with respect to the photometry areas adjacent to or surrounding the at least one photometry area, and the output of the photometry system with respect to the at least one photometry area is greater than a second predetermined value which is greater than the first predetermined value.

Further, the exposure compensation amount is set to zero by the exposure compensation amount compensating system if the judged color is yellow, and if the difference between the output of the photometry system with respect to the photometry areas adjacent to or surrounding the at least one photometry area, and the output of the photometry system with respect to the at least one photometry area is smaller than a third predetermined value which is smaller than the first predetermined value.

Still optionally, the photometry system may include a normal photometry sensor, the spectral sensitivity characteristic of which has a peak sensitivity at a wavelength within a range from 500 nm through 600 nm, and the colorimetry system may include a blue light photometry sensor for metering blue light component, a green light photometry sensor for metering green light component, and a red light photometry sensor for metering red light component.

In this case, the green light photometry sensor may be used as both the normal photometry sensor and the colorimetric sensor.

According to another aspect of the invention, there is provided a photometry device for a camera, which is provided with a photometry system that divides a photographing area into a plurality of photometry areas and performs a photometry operation with respect to each of the plurality of photometry areas, a colorimetry system that divides a photographing area into a plurality of areas and performs a colorimetry operation with respect to at least one of the plurality of areas, an exposure amount determining system that determines an exposure amount of an object in accordance with outputs of the photometry system, a compensation amount determining system that judges a color of the object in accordance with the output of the colorimetry system and determining an exposure compensation amount in accordance with the judged color, and an exposure compensation amount compensating system that compensates for the exposure compensation amount in accordance with differences among outputs of the photometry system.

Optionally, the compensation amount compensating system may compensate for the exposure compensation amount in accordance with a contrast value, the contrast value being defined as a difference between a maximum output and minimum output of the photometry system.

Optionally or alternatively, the compensation amount compensating system may compensate for the exposure compensation amount such that the greater the differences are, the smaller the exposure compensation amount is.

Further optionally or alternatively, the compensation amount compensating system may compensate for the exposure compensation amount such that the greater the contrast value is, the smaller the exposure compensation amount is.

Still optionally, the photometry system may include a normal photometry sensor, the spectral sensitivity characteristic of which has a peak sensitivity at a wavelength within a range from 500 nm through 600 nm, and the colorimetry system may include a blue light photometry sensor for metering blue light component, a green light photometry sensor for metering green light component, and a red light photometry sensor for metering red light component.

In this case, the green light photometry sensor may be used as both the normal photometry sensor and the colorimetric sensor.

BRIEF DESCRIPTION OF THE ACCOMPANYING DRAWINGS

FIG. 1 shows a perspective view of a camera employing a photometry device according to the invention;

FIG. 2 schematically shows main components of the camera shown in FIG. 1;

Figure 4A:
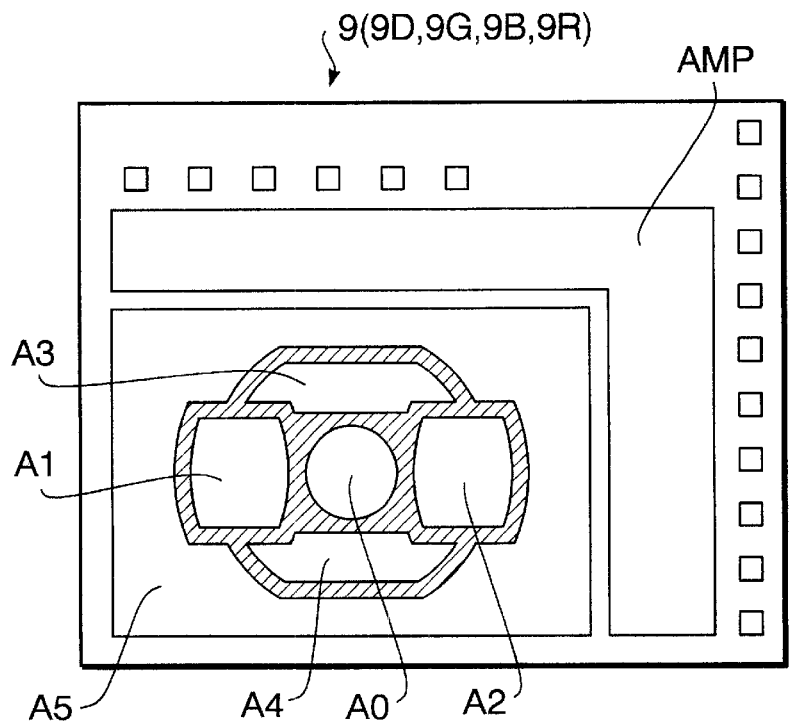
Figure 4B:
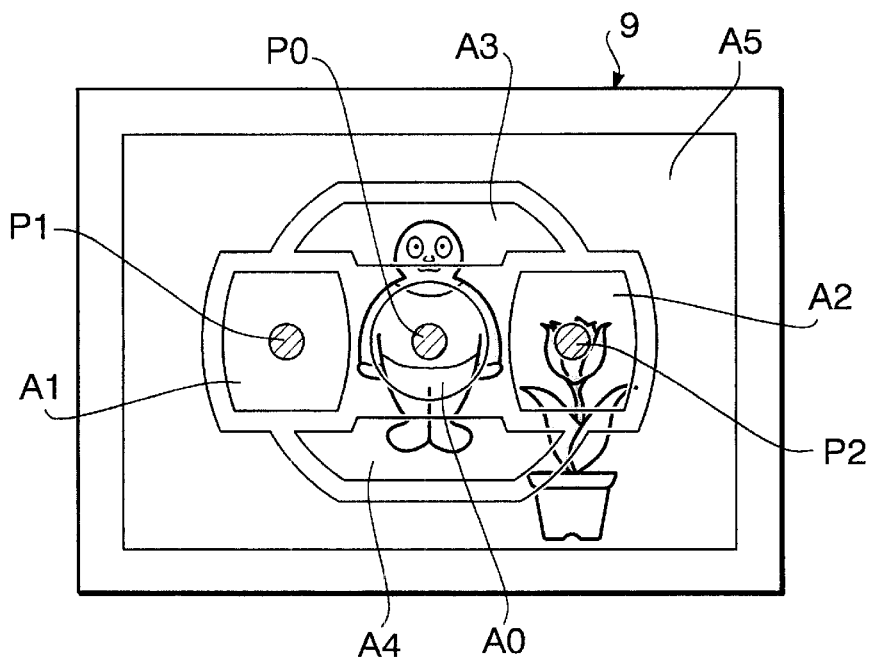
Figure 6:
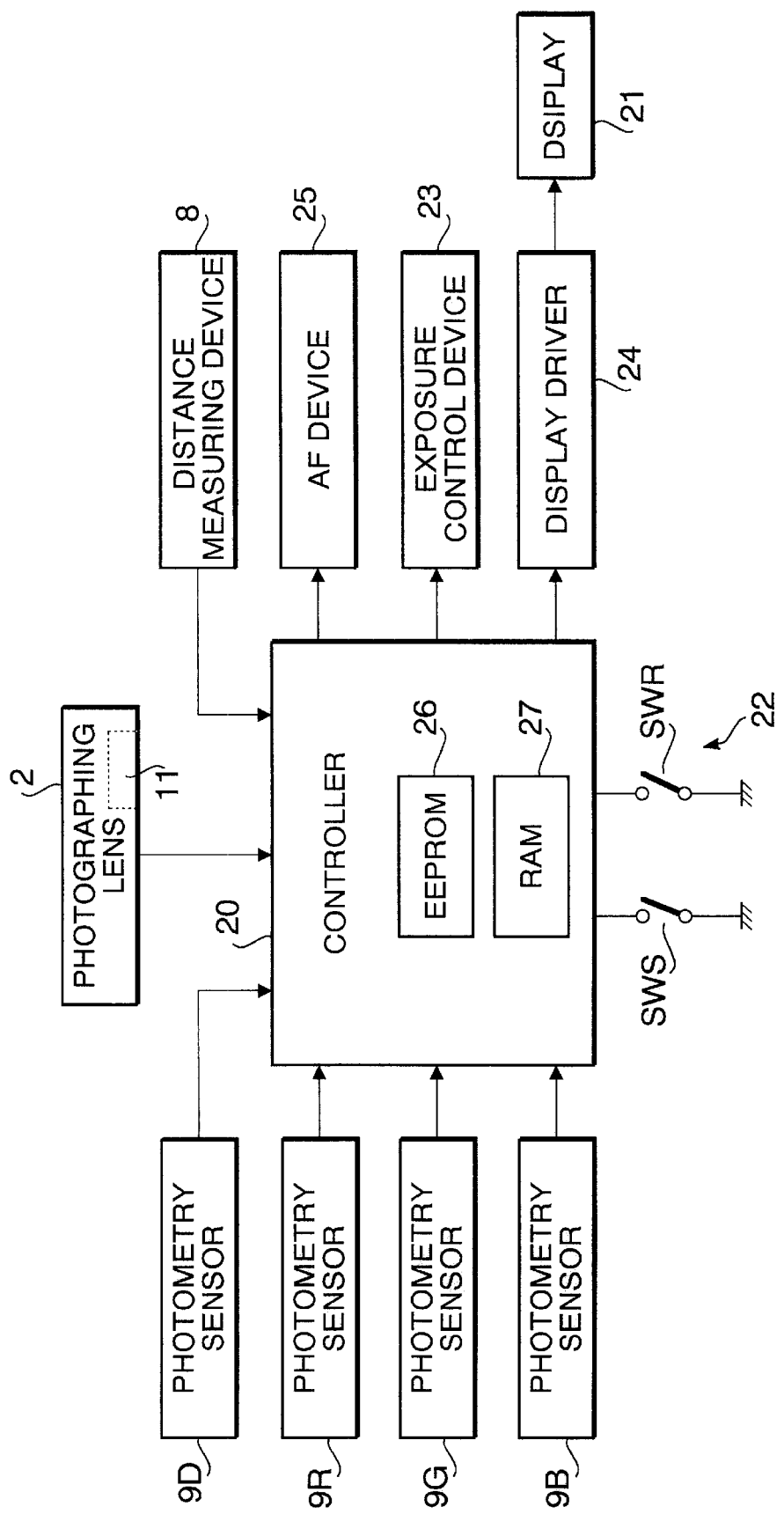
Figure 7:
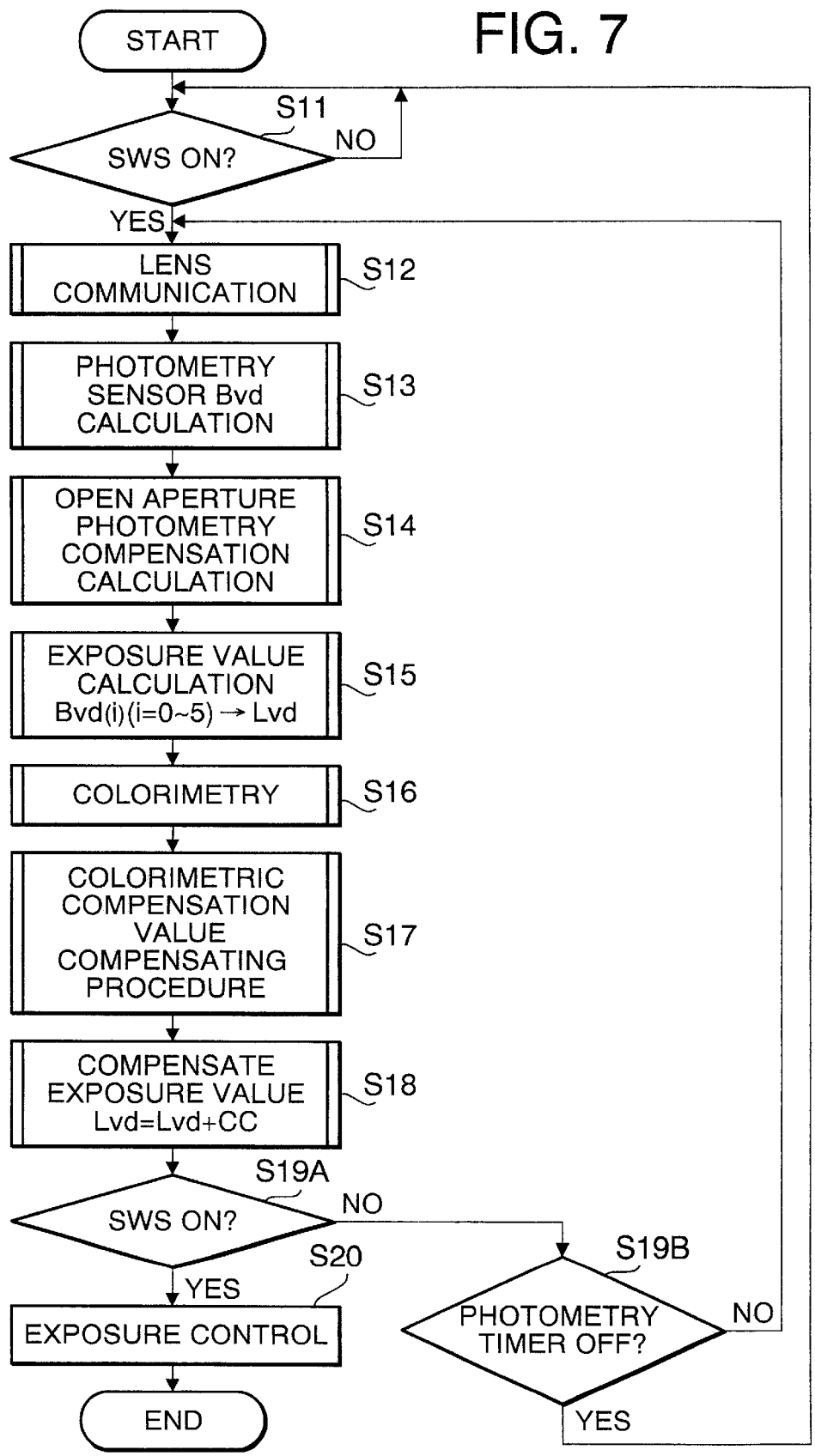
Figure 8:
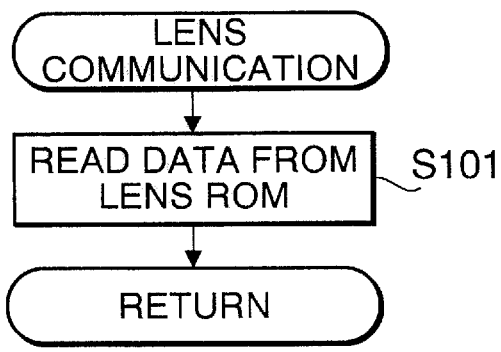
Figure 9:
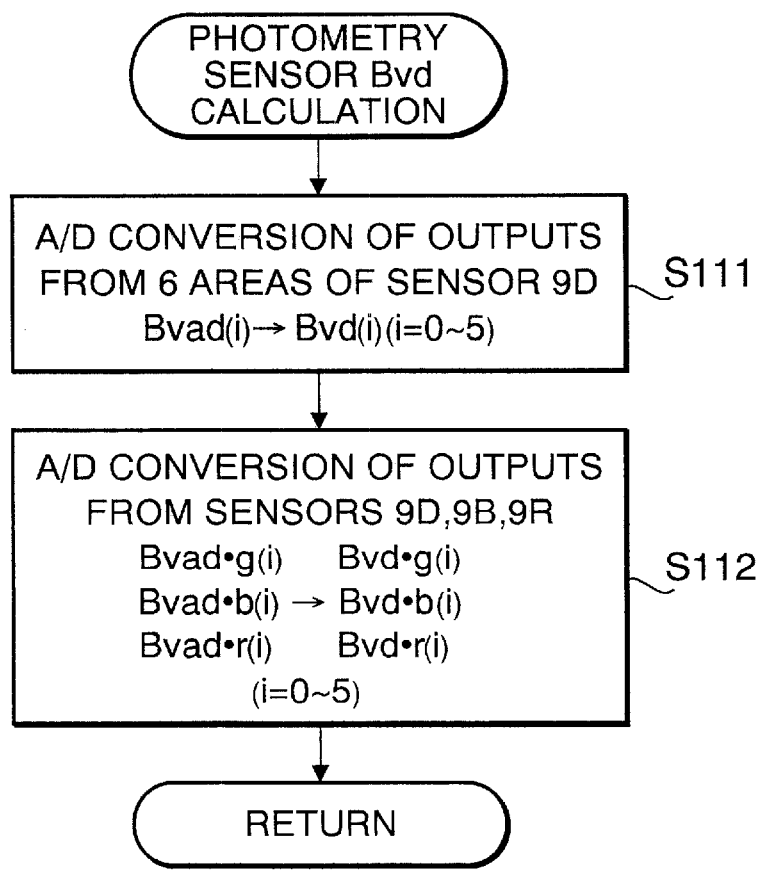
Figure 10:
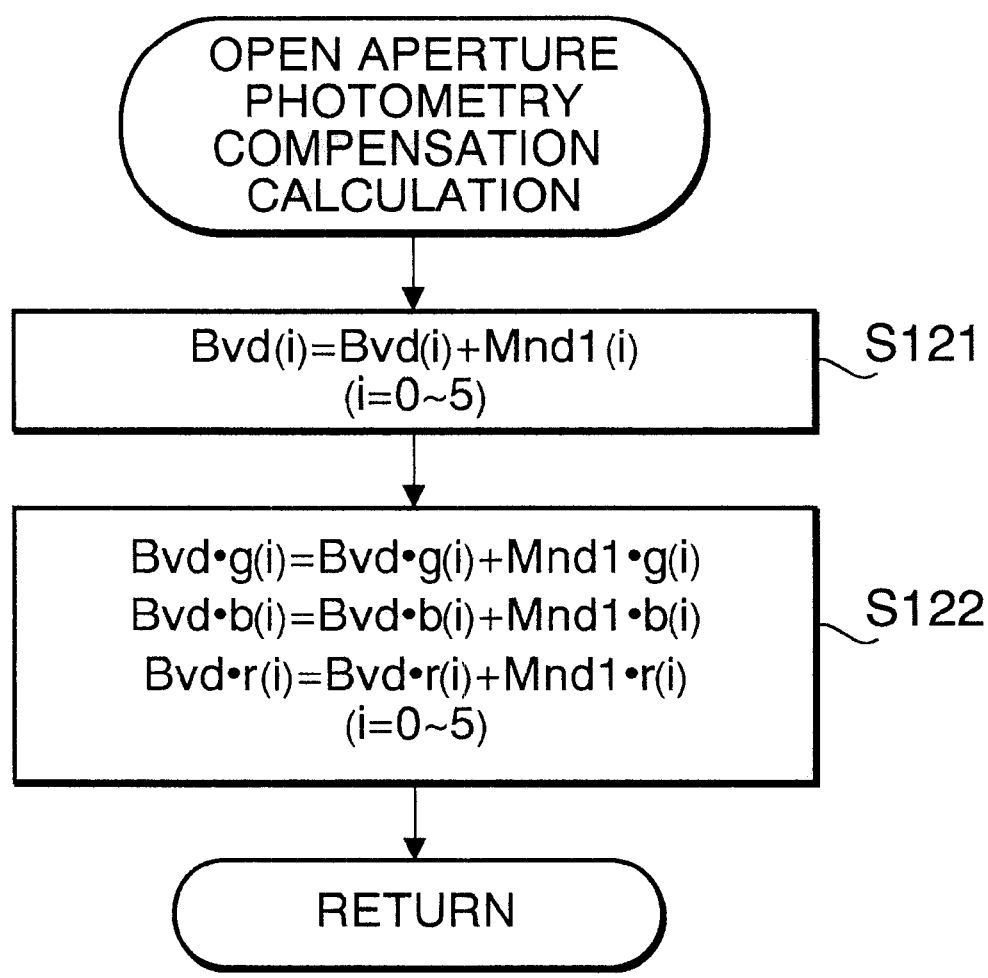
Figure 11:
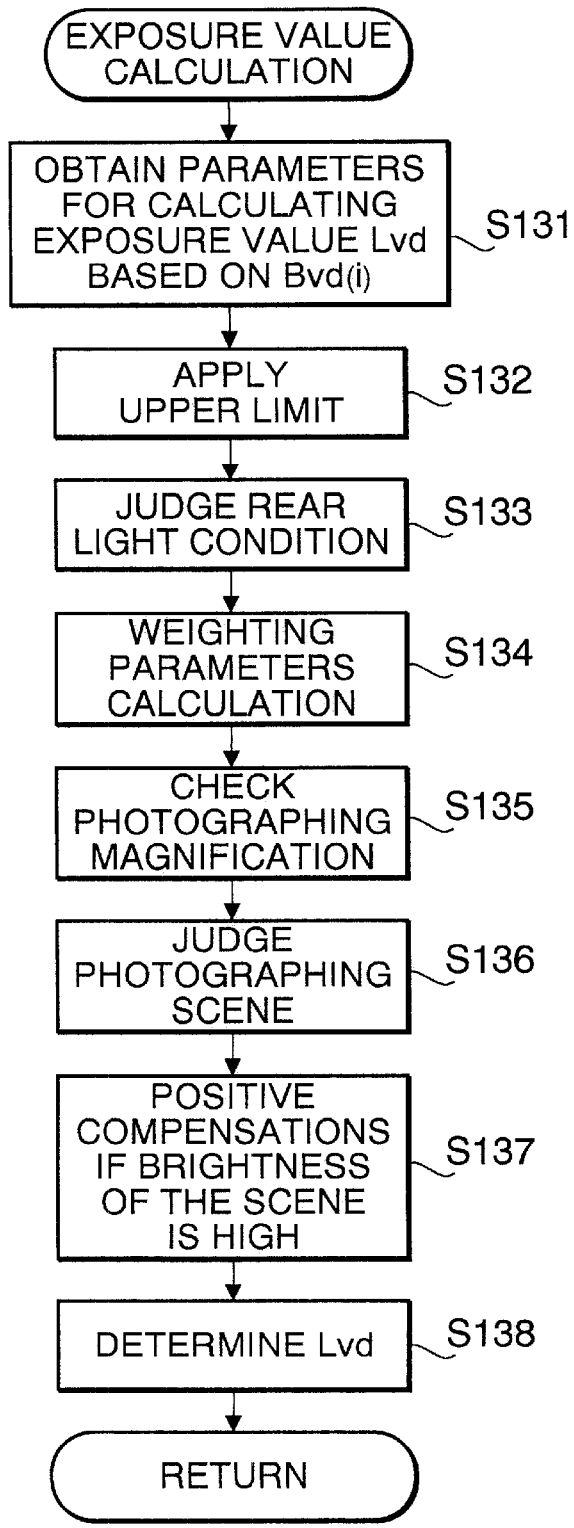
Figure 12:
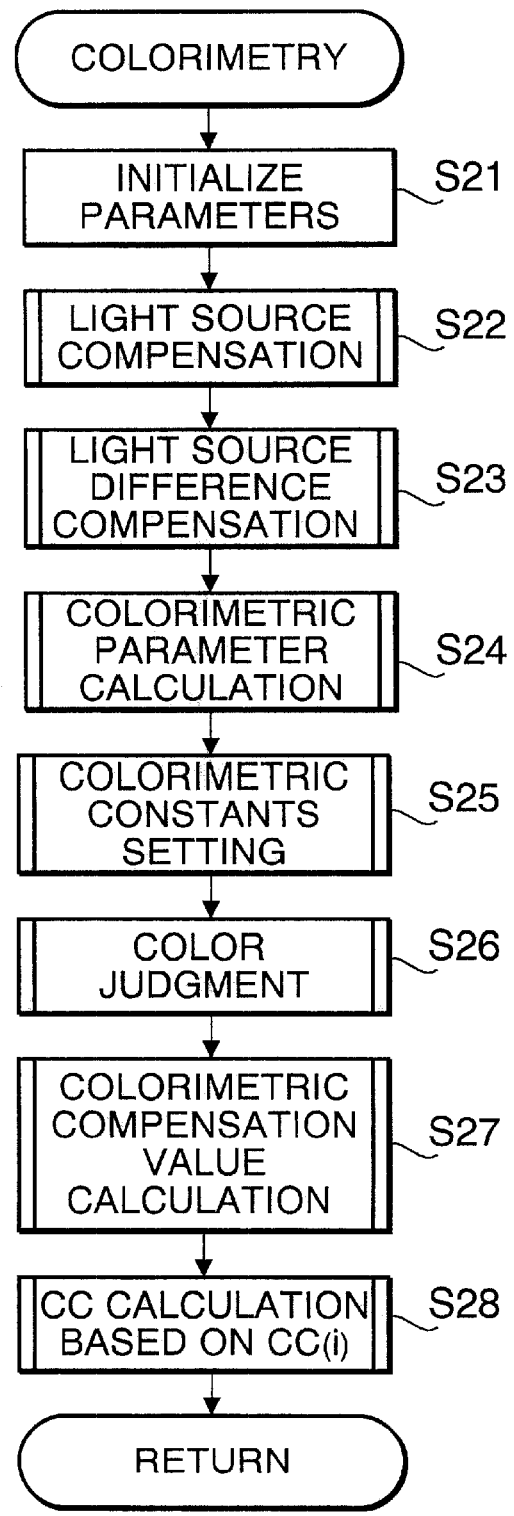
Figure 13:
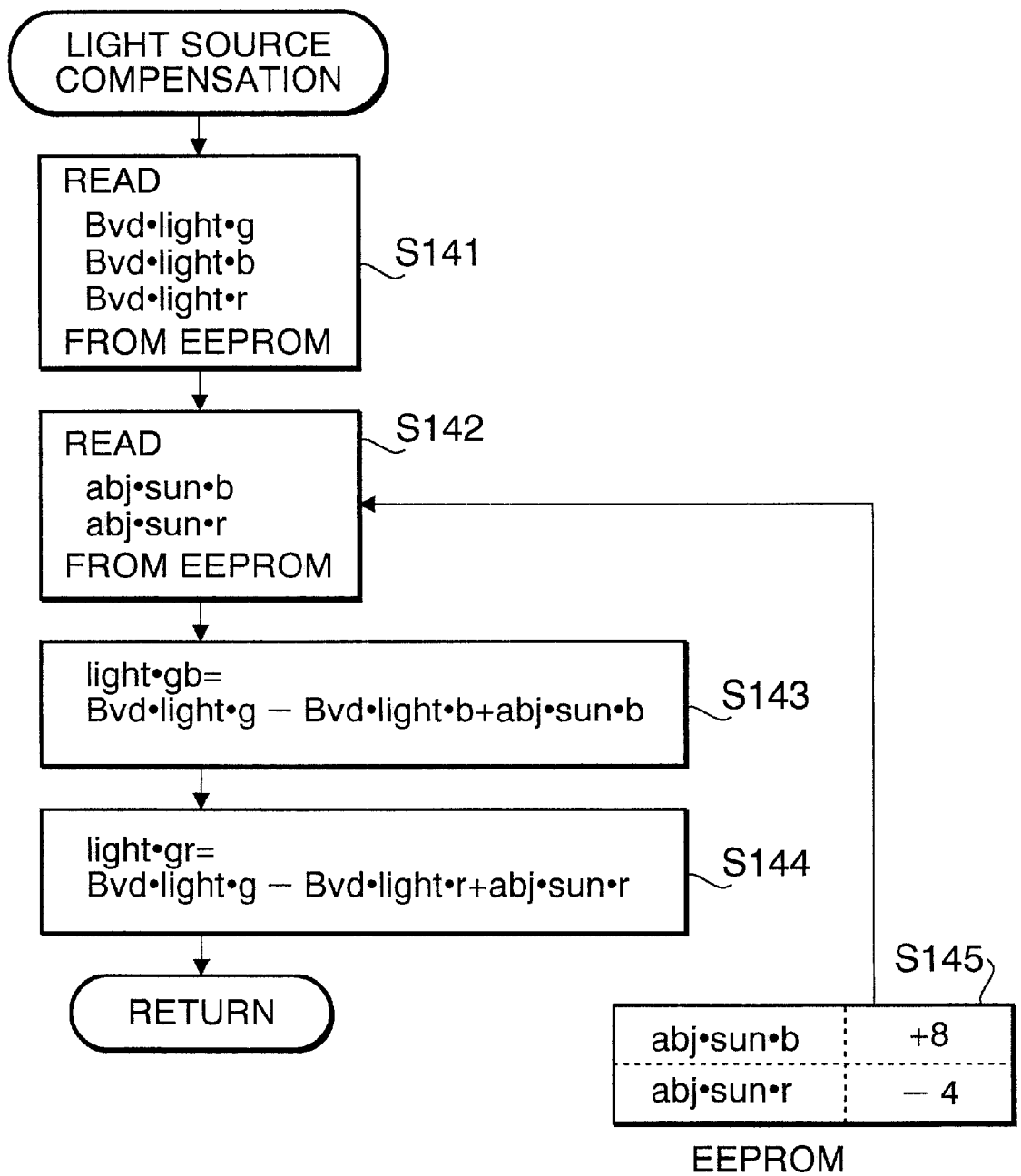
Figure 14:
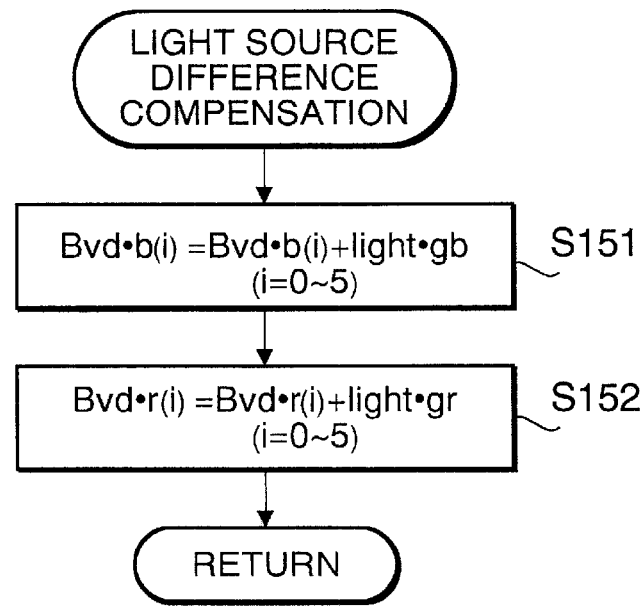
Figure 15:
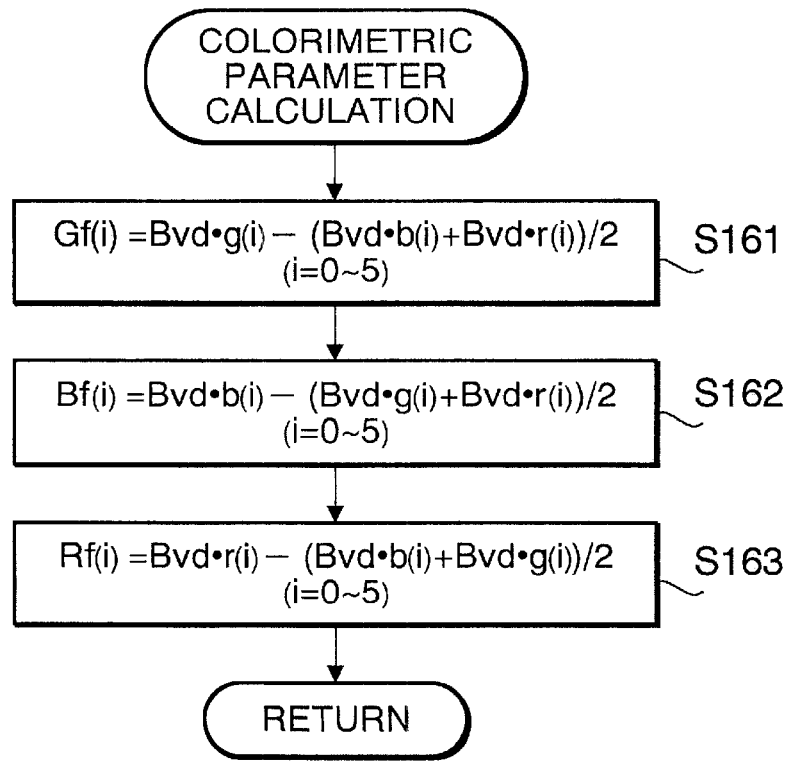
Figure 16:
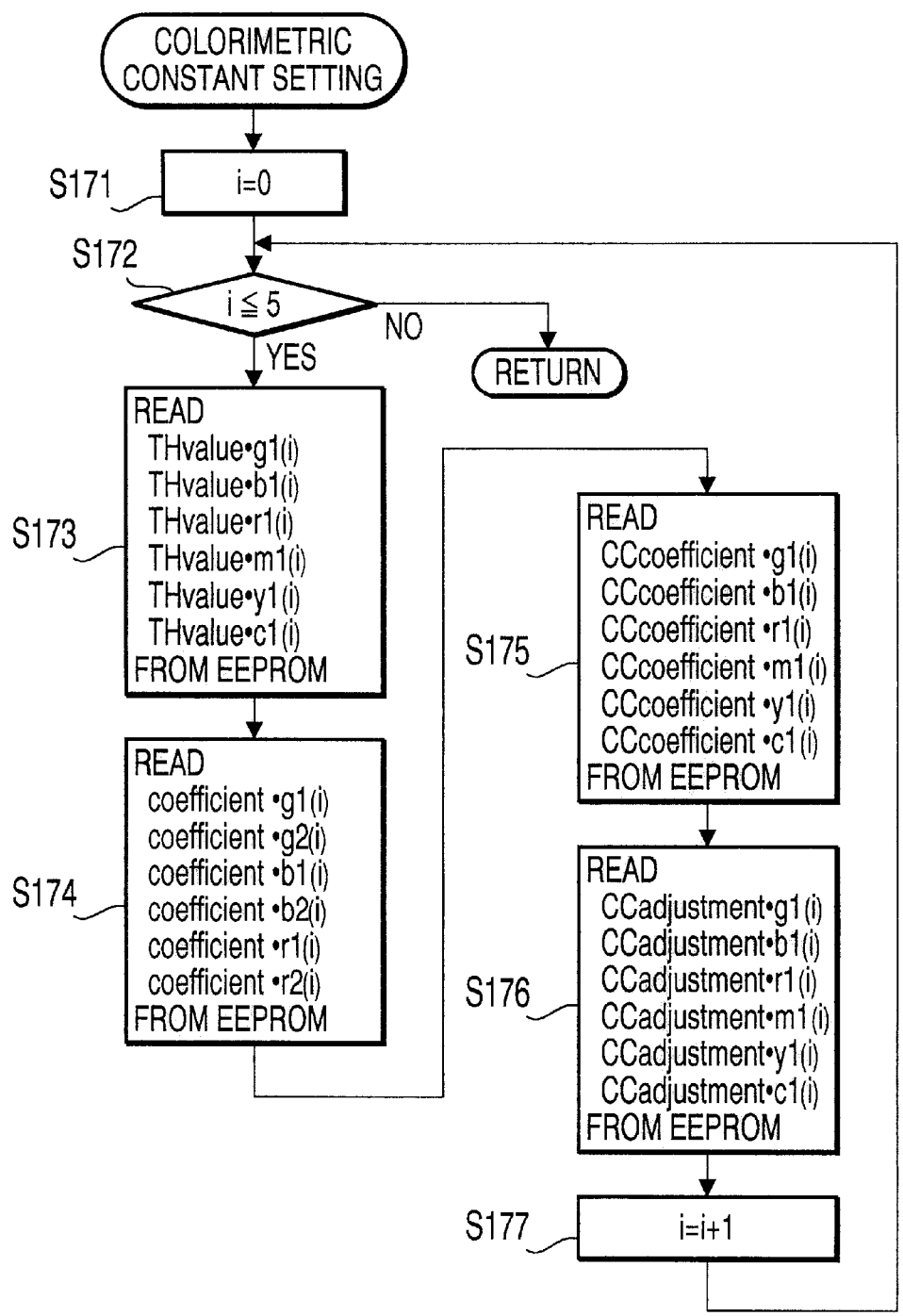
Figure 18:
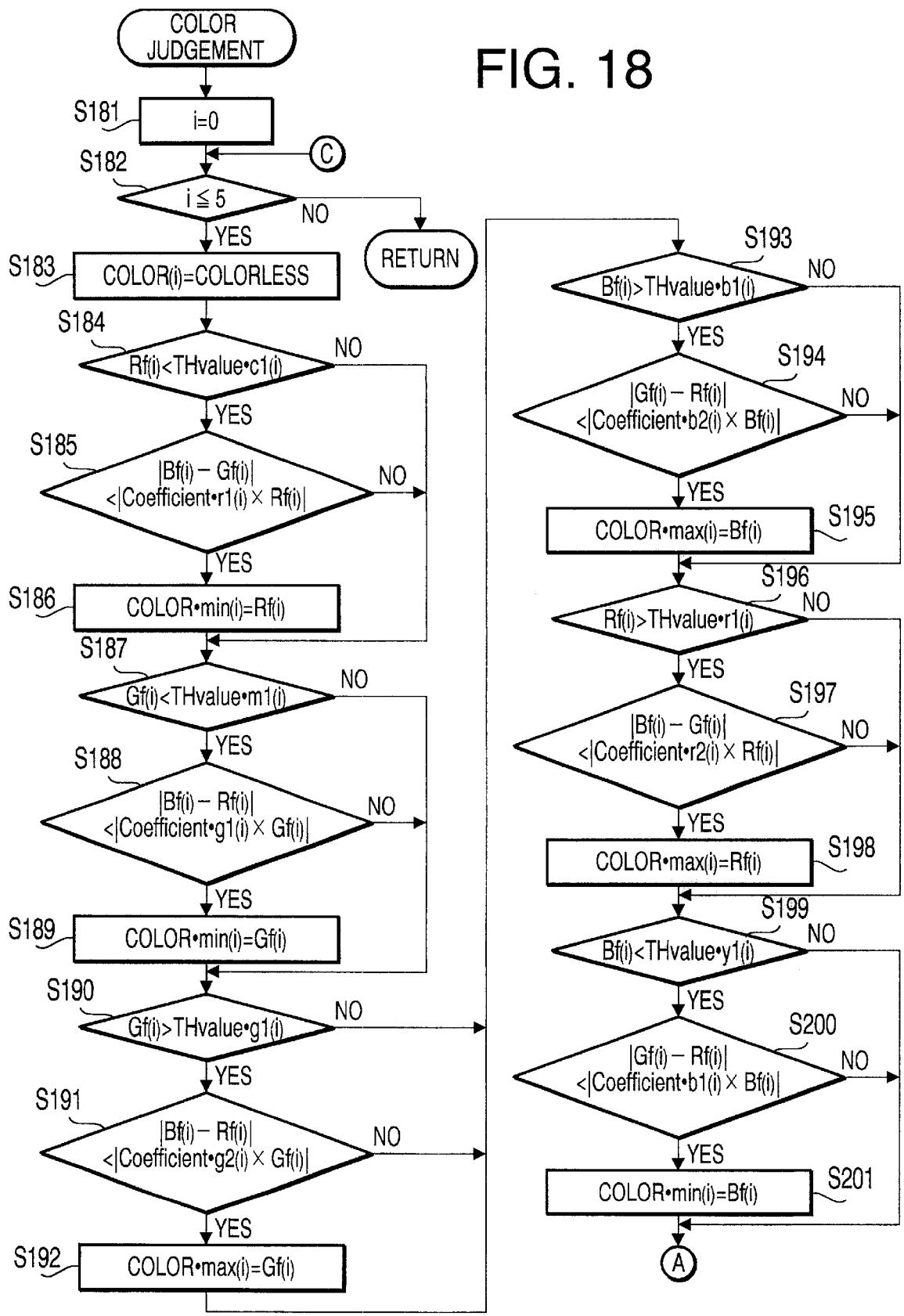
Figure 19:
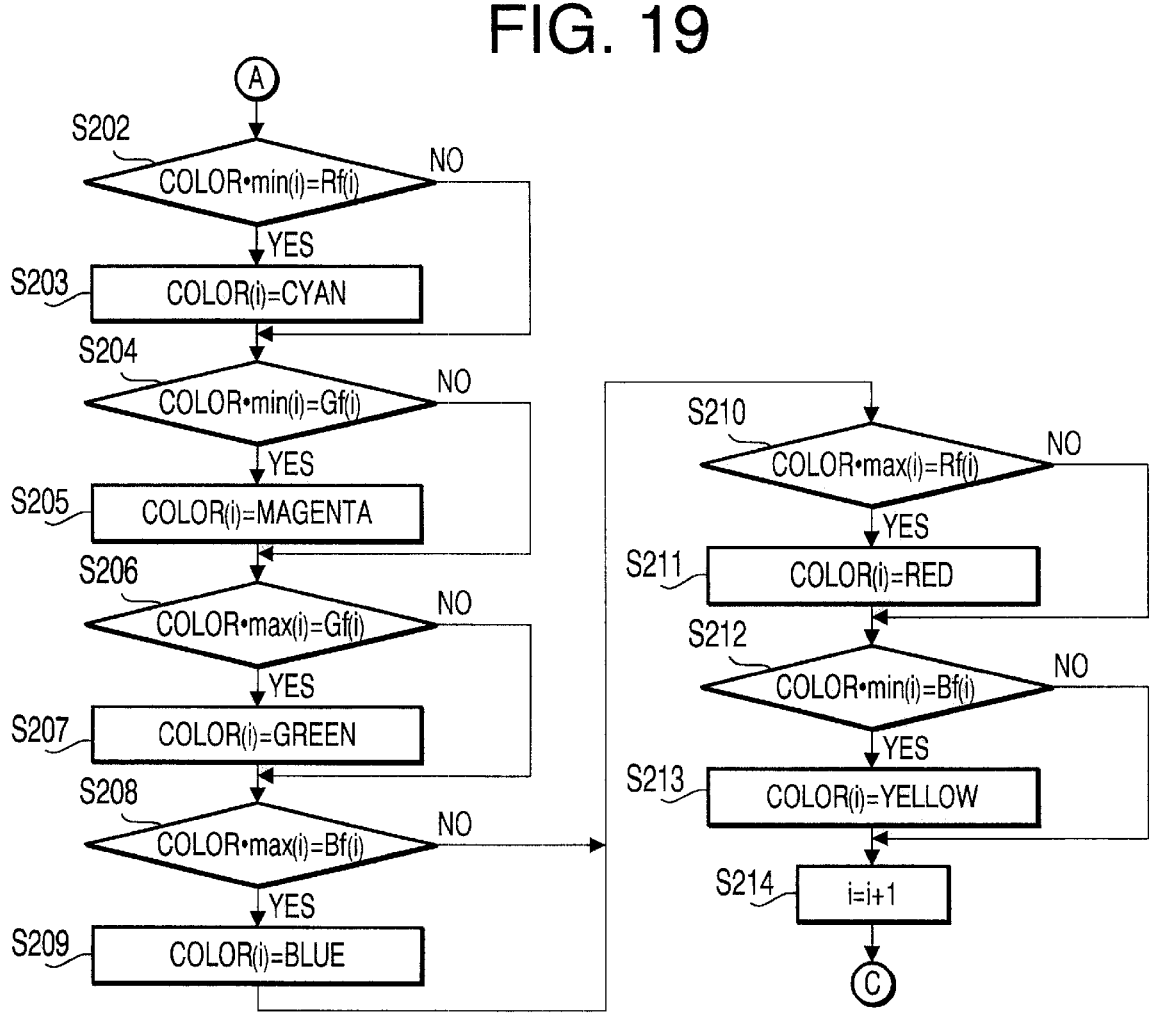
Figure 20:
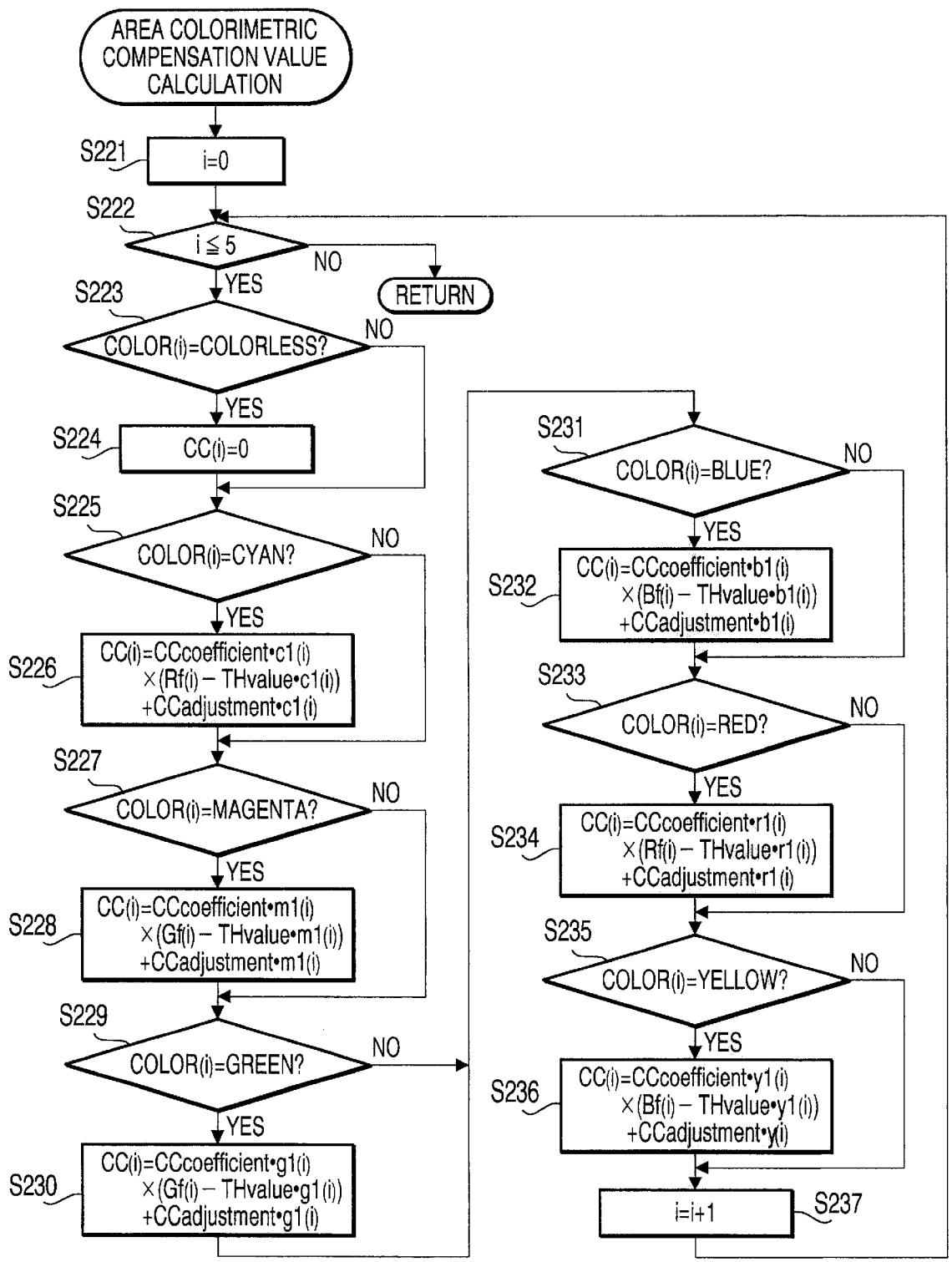
Figure 21:
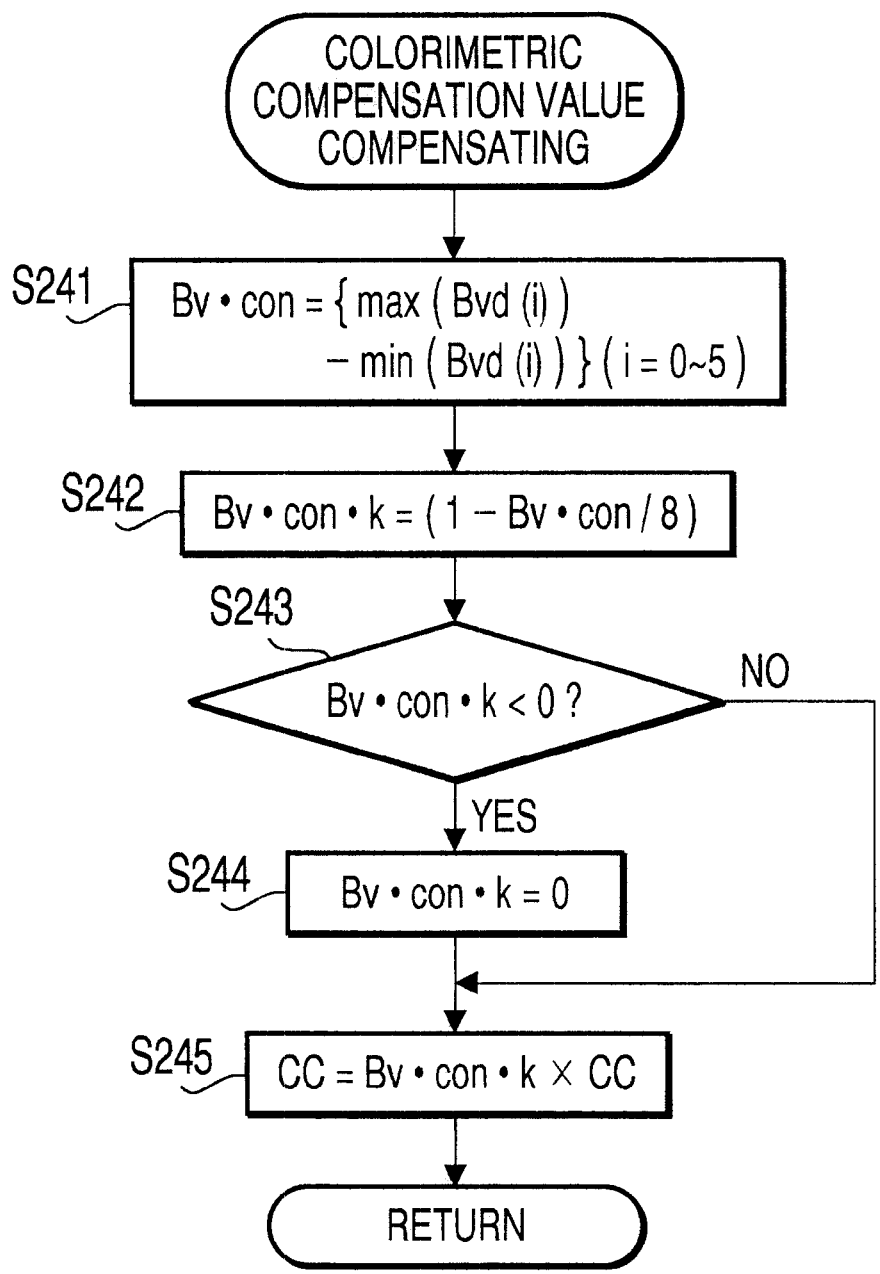
Figure 22:
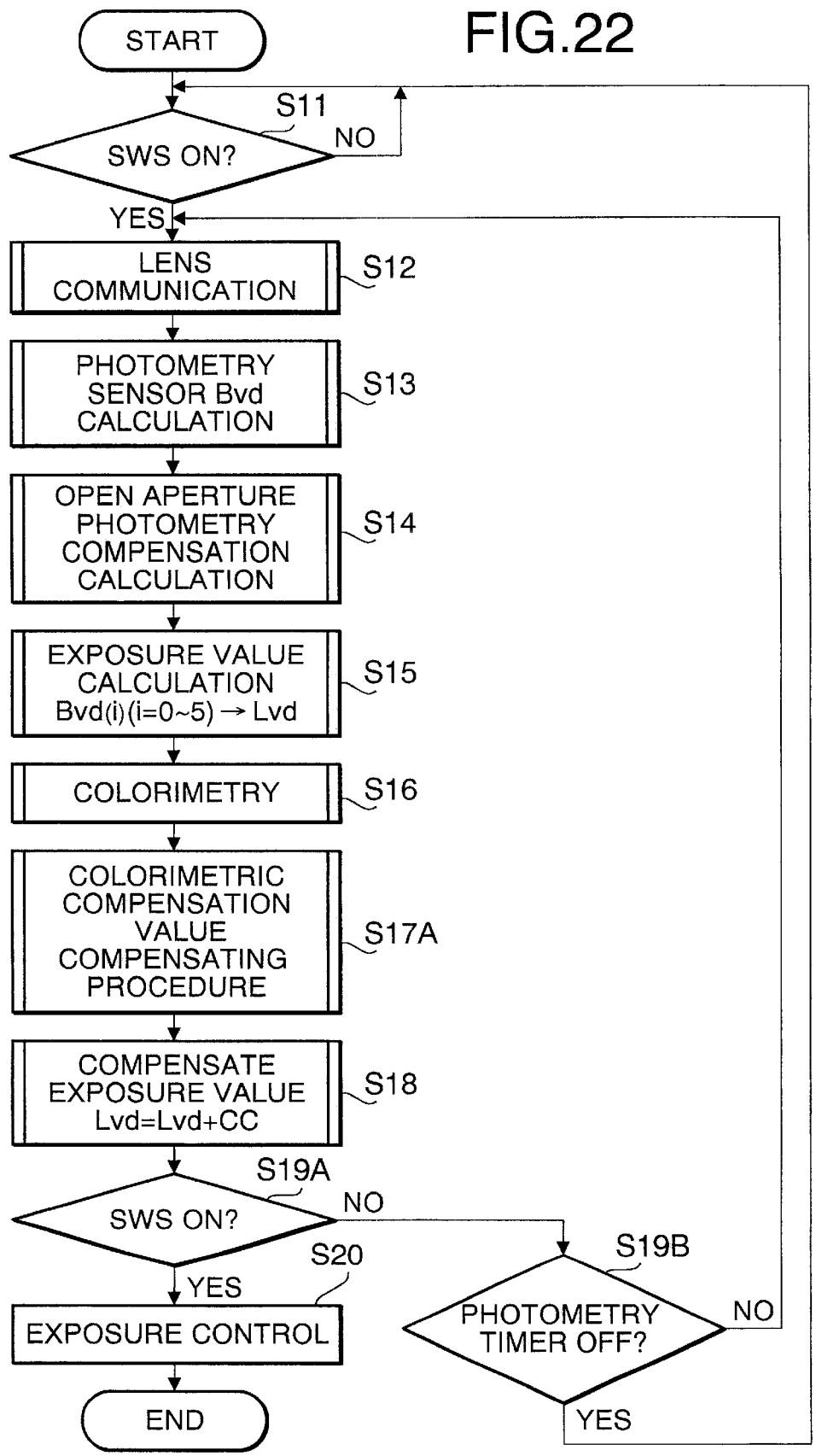
Figure 23:
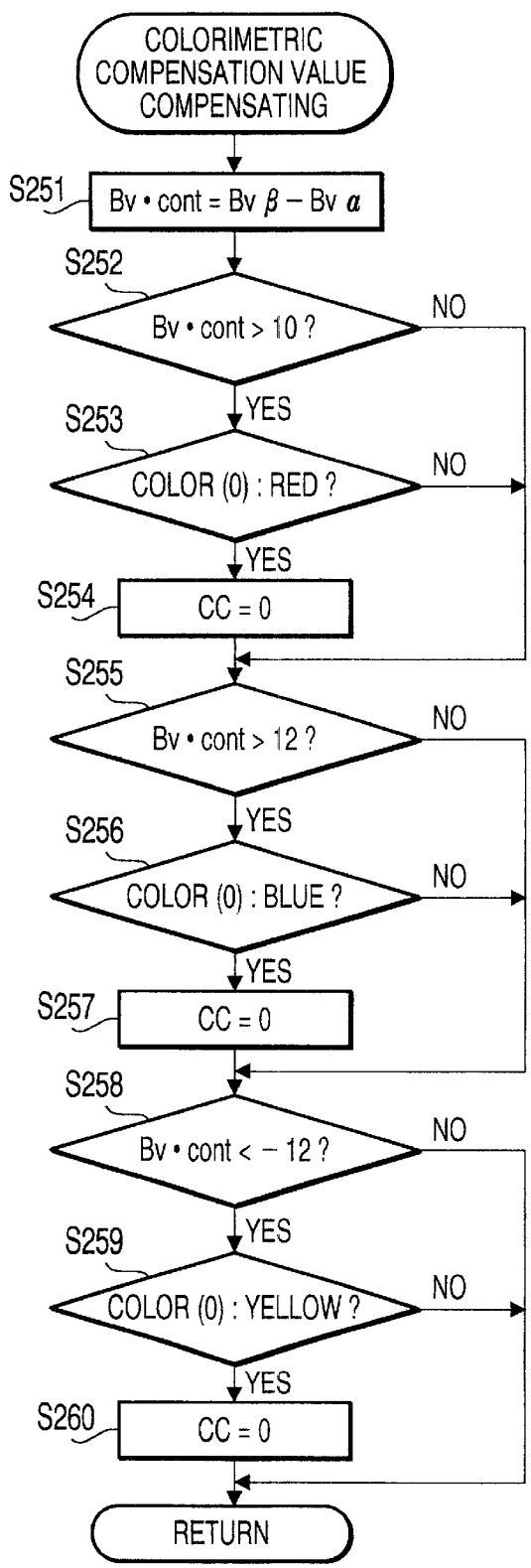

FIG. 4A schematically shows a structure of each of the photometry sensors;

FIG. 4B shows a relationship between the photometry areas and distance measuring points of each photometry sensor;

FIG. 5 shows spectral sensitivity characteristics of the green, blue and red sensors;

FIG. 6 shows a block diagram of main portions of the camera;

FIG. 7 is a flowchart illustrating a main procedure of a photometry operation according to a first embodiment;

FIG. 8 is a flowchart illustrating a "lens communication procedure";

FIG. 9 shows a flowchart illustrating a "photometry sensor Bvd calculation procedure";

FIG. 10 is a flowchart illustrating an "open aperture photometry compensation calculation procedure";

FIG. 11 is a flowchart illustrating an "exposure value calculating procedure";

FIG. 12 is a flowchart illustrating a "colorimetry procedure";

FIG. 13 is a flowchart illustrating a "light source compensation procedure";

FIG. 14 is a flowchart illustrating a "light source difference compensation procedure";

FIG. 15 is a flowchart illustrating a "colorimetric parameter calculation procedure";

FIG. 16 is a flowchart illustrating a "colorimetric constant setting procedure";

FIG. 17 shows an example of constants read from an EEPROM;

FIGS. 18 and 19 show a flowchart illustrating a "color judgment procedure";

FIG. 20 is a flowchart illustrating an example of an "area colorimetric compensation value calculating procedure";

FIG. 21 is a flowchart illustrating a colorimetric compensation value compensating procedure according to the first embodiment;

FIG. 22 is a flowchart illustrating a main procedure of a photometry operation according to a second embodiment; and FIG. 23 is a flowchart illustrating a colorimetric compensation value compensating procedure according to the second embodiment.

DESCRIPTION OF THE EMBODIMENTS

Hereinafter, referring to the accompanying drawings, embodiments according to the present invention will be described.

Figure 1:
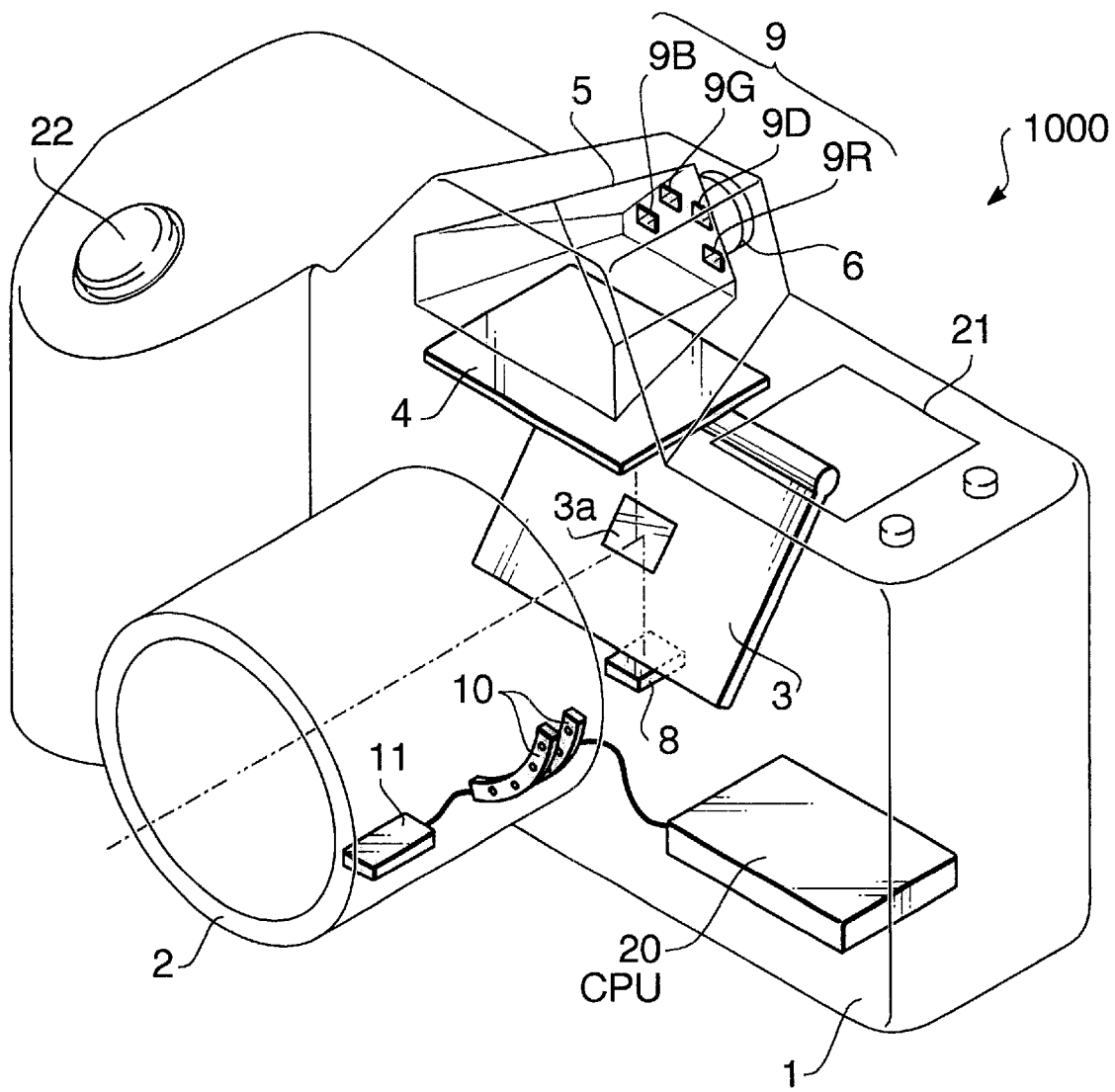
Figure 2:
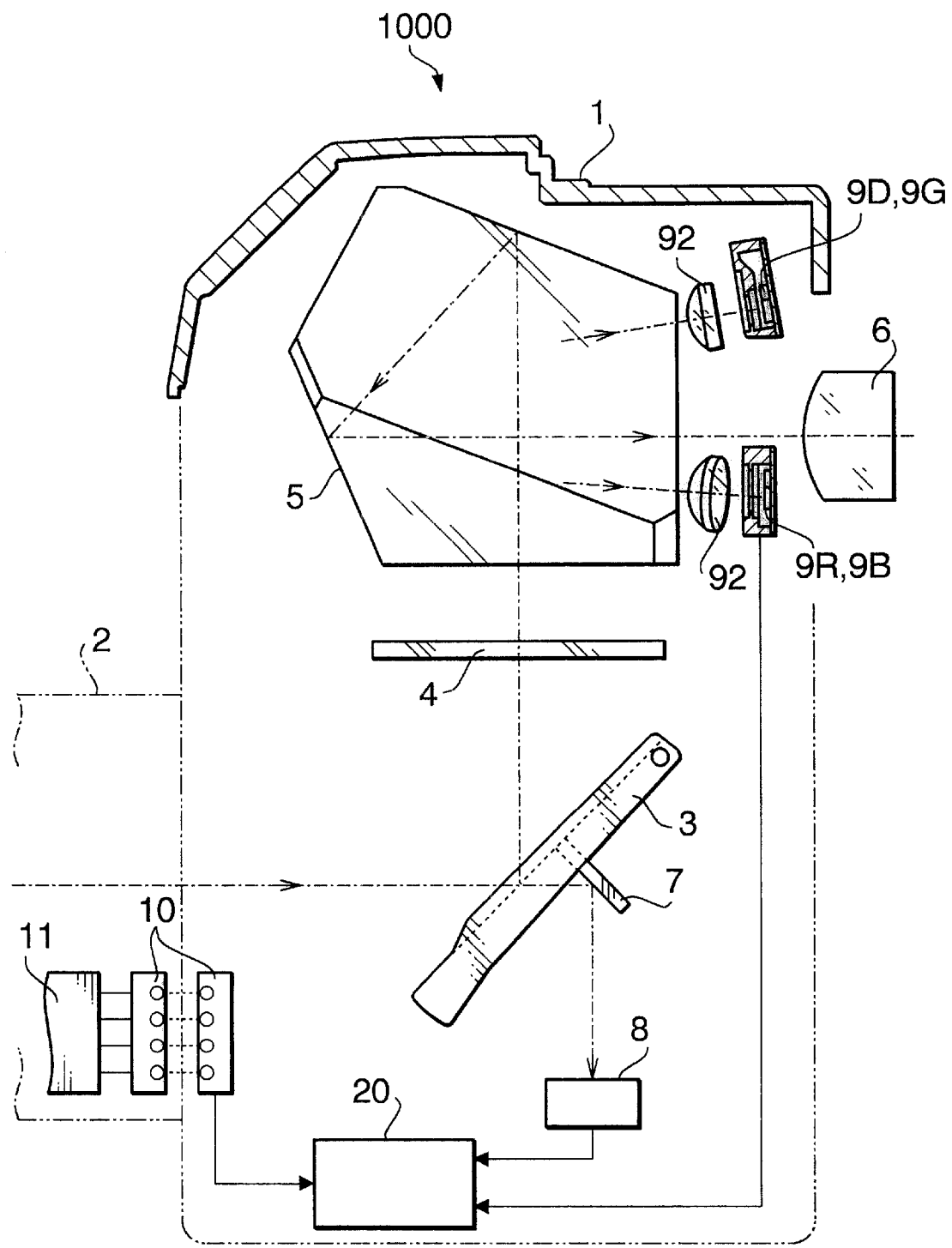

FIG. 1 shows a perspective view of a camera 1000 employing a photometry device according to the invention, and FIG. 2 schematically shows main components of the camera 1000.

The camera 1000 has a camera body 1, to which a photographing lens 2 is detachably coupled. The camera body 1 accommodates a quick return mirror 3, a focusing glass 4, a pentagonal prism 5 (or a pentagonal mirror), and an eyepiece optical system 6. A part of the quick return mirror 3 is formed to be a half mirror 3a (see FIG. 1), and behind the half mirror 3a, an auxiliary mirror 7 is provided. Light passed through the half mirror 3a is reflected by the auxiliary mirror 7, and is directed toward a multi-point distance measuring device 8. The distance measuring device 8 is used for a multi-AF (Automatic focusing) control. Namely, using the multi-point distance measuring device 8, a plurality of distance measuring data are obtained at a plurality of distance measuring points and the distance measuring data corresponding to the plurality of distance measuring points is selected. Then, in accordance with the selected distance measuring data, AF control is performed. On an eyepiece side of the pentagonal prism 5, four photometry sensors 9 (9D, 9R, 9G and 9B) are provided, each of which functions as a photometry element and colorimetry elements and receives light passed through the photographing lens 2. The photographing lens 2 and the camera body 1 are electrically connected through electrical contacts 10. Thus, a lens ROM 11 built in the photographing lens 2 is electrically connected to a control circuit 20 accommodated in the camera body 1. On an outer surface of the camera body 1, an LCD (liquid crystal display) 21, and various buttons such as a release button 22 are provided. Furthermore, inside the camera body 1, various mechanisms such as a film winding mechanism are provided. However, such mechanisms are conventionally known, and description thereof will be omitted for the sake of the simplicity.

Figure 3A:
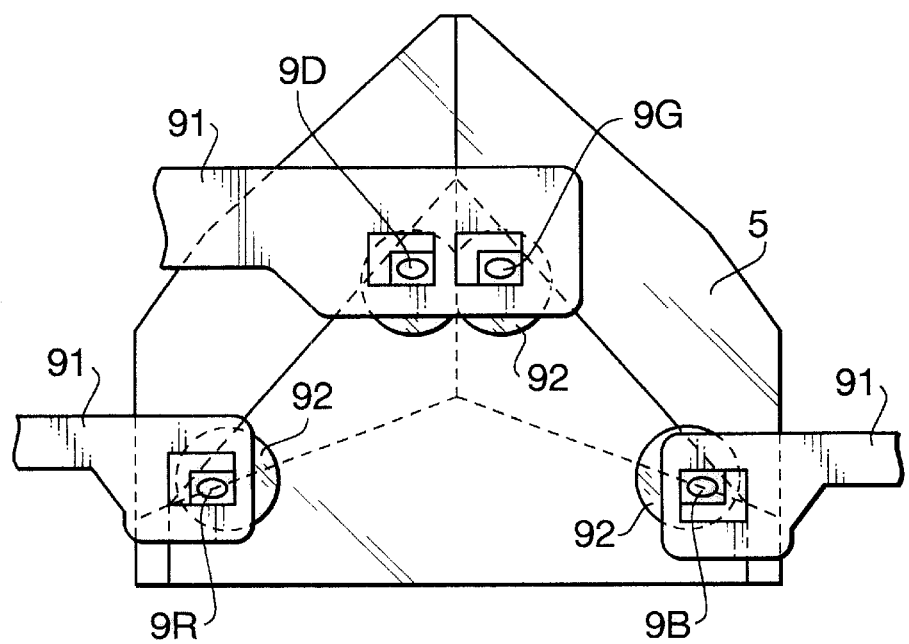
FIG. 3A shows an arrangement of photometry sensors.

FIG. 3A shows a rear view of the pentagonal prism 5 and the photometry sensors 9. As shown in FIG. 3A, the four photometry sensors 9 include sensors 9D and 9G provided at an upper central portion on the eyepiece side of the pentagonal prism 5, and sensors 9B and 9R provided at lower side portions on the eyepiece side of the pentagonal prism 5. The photometry sensors 9D, 9G, 9B and 9R are mounted on an FPC (flexible printed circuit board) 91 and fixedly positioned at the above-described respective positions by the FPC 91. In front of (i.e., on the pentagonal prism side of) each of the photometry sensors 9D, 9G, 9B and 9R, a collective lens 92 is provided to form an object image on each of the sensors 9D, 9G, 9B and 9R.

FIG. 4A schematically shows a structure of each of the sensors 9D, 9G, 9B and 9R. As shown in FIG. 4A, each sensor 9 (9D, 9G, 9B or 9R) is constructed as a planar structure photometry IC chip that is configured such that a light receiving section and an amplifier AMP are integrally formed. The light receiving section includes six photometry areas, i.e., a central area A0, a left area A1, a right area A2, an upper area A3, a lower area A4, and a peripheral area A5. FIG. 4B shows a relationship among the photometry areas A0–A5, portions of an object, and distance measuring points P0–P2. The photometry areas A0–A5 of each sensor receive the light from respective portions of an object as indicated in FIG. 4B. The photometry sensor 9G is provided with a green filter on its light receiving surface, and receives a green component of light, the photometry sensor 9B is provided with a blue filter on its light receiving surface, and receives a blue component of light, and the photometry sensor 9R is provided with a red filter on its light receiving surface, and receives a red component of light. In this embodiment, the three sensors 9G, 9B and 9R are used as colorimetry elements. Spectral sensitivity characteristics of the sensors 9G, 9B and 9R respectively provided with the green, blue and red filters are indicated in FIG. 5. The spectral sensitivity of the sensors 9G, 9B and 9R respectively provided with the green, blue, and red filters have peaks, in sensitivity, at approximately 540 nm, 420 nm, and 620 nm, respectively. The remaining sensor 9D is not provided with a color filter, but a luminosity compensating filter is provided. The spectral sensitivity characteristic of the sensor 9D provided with the luminosity compensating filter has its peak within a wavelength range of 500–600 nm, which is close to the visual sensitivity characteristic. The sensor 9D is used as a normal light detecting sensor.

FIG. 6 shows a block diagram of main portions of the camera 1000. The four sensors 9D, 9G, 9B and 9R output values indicative of quantity of received light (components) to the controller 20, respectively. Further, the output (i.e., a distance value) of the distance measuring device 8 is input to the controller 20, which controls the AF device 25 to perform the automatic focusing operation.

Furthermore, the controller 20 is connected with a photometry switch SWS and a shutter-release switch SWR. The photometry switch SWS is ON when the release button 22 is depressed halfway. The shutter-release switch SWR is ON when the shutter button is fully depressed. When the shutter button is depressed halfway and the photometry switch SWS is turned ON, the controller 20 performs a photometry calculation in accordance with a predetermined algorithm, and calculates an exposure value. Then, the controller 20 controls the exposure control device 23 in accordance with the calculated exposure value to perform a photographing operation. Further, the controller 20 drives a display driver 24 to display the calculated exposure value on the LCD panel 21. It should be noted that the controller 20 includes an EEPROM 26 that stores various values necessary for the photometry calculation (which will be described in detail later), and a RAM 27 for temporarily storing various pieces of data.

It should be noted that the multi-point distance measuring device 8 detects distances at a plurality of points. According to the embodiment, the multi-point distance measuring device detects distances at points P0, P1 and P2 inside the areas A0, A1 and A2, respectively (see FIG. 4B). When the controller 20 performs the AF procedure described above, data representing the distances at point P0, P1 and P2 are stored in the RAM 27, and then, based on the data corresponding to the point(s) P0, P1 and/or P2 satisfying a certain condition, the photographing lens 2 is moved for focusing. For example, the closest one of the points P0, P1 and P2 is selected, or an intermediate one of the points P0, P1 and P2 is selected.

First Embodiment

An operation of the photometry device according to a first embodiment will be described hereinafter.

FIG. 7 is a flowchart illustrating a main procedure of a photometry operation. When the release button 22 is depressed halfway and the photometry switch SWS is ON (S11: YES), a "lens communication procedure" is performed (S12) so that the controller 20 receives data intrinsic to the photographing lens 2 currently mounted onto the camera body 1. Specifically, the data intrinsic to the photographing lens 2 includes an open f-number, a focal length of the photographing lens 2 and the like, which may affect the photometry calculation, intrinsic to the photographing lens 2. The data is transmitted from a lens ROM 11 of the photographing lens 2 to the controller 20 through the electrical contacts 10. Then, a "photometry sensor output Bvd calculation procedure" is executed (S13). In this procedure, the photometry sensors 9 (9D, 9G, 9B and 9R) output analog photometry values which are obtained by receiving light through the photographing lens 2, quick return mirror 3, and the pentagonal prism 5. Then, the analog values are converted into digital brightness values Bvd which can be used in the operation at S20 executed by the controller 20. Then, based on the brightness value Bvd obtained at S13 and the lens data intrinsic to the photographing lens 2 retrieved at S12, an "open aperture photometry compensation calculation procedure" is executed (S14) to compensate for errors depending on individual photographing lenses.

At S15, an "exposure value calculation procedure" is executed. In this procedure, based on the brightness value Bvd, which is obtained in accordance with the output of the photometry sensor 9D for normal light, an exposure value Lvd is calculated. In this procedure, parameters for calculating the exposure value Lvd in accordance with photographing conditions, e.g., a rear light condition, a magnification and/or scene of photographing, are obtained. Then, based on the parameters, the exposure value Lvd is calculated.

At S16, based on the brightness value Bvd obtained by each of the sensors 9R, 9B and 9G for the RGB (Red, Green and Blue) color components, a "colorimetry procedure" is executed to determine the color of the object, and a colorimetric compensation value CC is calculated based on the determined color of the object.

In a colorimetric compensation value compensating procedure (S17), the contrast of the object is determined based on the brightness value Bvd of the normal light sensor 9D. Then, based on the brightness value Bvd, the colorimetry compensation value CC is compensated.

In S18, an "exposure value colorimetric compensation procedure" is executed, where the exposure value Lvd obtained at S15 is compensated based on the colorimetric compensation value CC, which has been compensated at S17.

At S19A, if the shutter-release switch SWR is ON (S19A: YES), the exposure control device 23 controls the exposure operation in accordance with the exposure value Lvd obtained at S18 to executed a photographing operation (S20). If the shutter-release switch SWR is OFF (S19A: NO), controls goes to S19B, where it is detected whether a photometry timer is OFF.

If the photometry timer is ON (i.e., if a predetermined period has not elapsed) (S19B: NO), control proceeds to S12, and the foregoing procedures are repeated. If the photometry timer is OFF (i.e., if the predetermined period has elapsed) (S19B: YES), control proceeds to S11.

FIG. 8 is a flowchart illustrating the "lens communication procedure", which is called at S12 of the main procedure shown in FIG. 7.

In the lens communication procedure, the controller 20 accesses the lens ROM 11 through the electrical contacts 10, and reads the data intrinsic to the photographing lens 2 stored in the lens ROM 11 (S101). The data is stored in the RAM 27 of the controller 20, and control returns. Items included in the data intrinsic to the photographing lens 2 include, for example, a lens type, lens data, the shortest focusable distance, a focusable range, a focal length of the photographing lens, an exit pupil position, an open f-number, an aperture efficiency and the like. In this embodiment, the controller 20 reads at least the focal length, the exit pupil position, the open f-number and the aperture efficiency, and stores the data in the RAM 27.

FIG. 9 shows a flowchart illustrating the "photometry sensor Bvd calculation procedure", which is called at S13 in the main procedure shown in FIG. 7.

In this procedure, data Bvad(i) (i=0, 1, . . . , 5) which represents A/D converted output voltages (analog data) of the photometry areas Ai (i=0, 1, . . . , 5) shown in FIG. 4 of the photometry sensor 9D for normal light is obtained. Further, data Bvad·g(i), Bvad·b(i) and Bvad·r(i), which represent A/D converted values of the output voltages of the photometry areas Ai (i=0, 1, 2, . . . , 5) of each of the sensors 9G, 9B and 9R for color components, are obtained. Then, the A/D converted values Bvad(i) of the sensor 9D output are adjusted to brightness values Bvd(i) (S111). The A/D converted values Bvad·g(i), Bvad·b(i) and Bvad·r(i) are also adjusted to the brightness values Bvd·g(i), Bvd·b(i) and Bvd·r(i), respectively (S112). It should be noted that, in S111 and S112, the output voltage values (analog data) of the sensors 9D, 9G, 9B and 9R are converted into digital data representing corresponding data values in accordance with the well-known A/D conversion procedure.

FIG. 10 is a flowchart illustrating the "open aperture photometry compensation calculation procedure" which is called at S14 of the main procedure shown in FIG. 7.

At S121, an open aperture photometry compensation value Mnd1(i) is calculated based on the focal length, the exit pupil position, the open f-number and the aperture efficiency stored in the RAM 27. Compensation values mv1, mv2, mv3 and mv4 for compensating for shift amounts with respect to the reference photometry values due to the individual differences of the optical characteristics of the cameras, and due to the individual differences of the focal length, the exit pupil position, the open aperture and the aperture efficiency of each photographing lenses, are determined. Then, the sum of the compensation values mv1+mv2+mv3+mv4 is obtained, which is referred to as the open aperture compensation value Mnd1(i). Following the similar procedure, the open aperture compensation values Mnd1·g (i), Mnd1·b(i), and Mnd1·r(i) are calculated. Then the open aperture compensation value Mnd1(i) is added to the brightness value Bvd(i), and then the sum is determined as a new brightness value Bvd (i). Thus, the following calculation is executed at S121:

$$Bvd(i)=Bvd(i)+Mnd1(i).$$

Similar to the above, with respect to the brightness values Bvd·g(i), Bvd·b(i) and Bvd·r(i) obtained by the photometry sensors 9G, 9B and 9R, open aperture photometry compensation values Mnd1·g(i), Mnd1·b(i) and Mnd1·r(i) are added to obtain newly defined brightness values (S122). That is:

$$Bvd·g(i)=Bvd·g(i)+Mnd1·g(i).$$

$$Bvd·b(i)=Bvd·b(i)+Mnd1·b(i).$$

$$Bvd·r(i)=Bvd·r(i)+Mnd1·r(i).$$

As a result, each brightness value is free from the affect of the individual differences of photographing lenses 2 when coupled to the camera body 1.

FIG. 11 is a flowchart illustrating an "exposure value calculating procedure", which is called at S15 of the main procedure.

In the "exposure value calculating procedure", the brightness values Bvd(i) are compensated in accordance with a photographing condition to obtain an appropriate exposure value Lvd. Specifically, in the "exposure value calculating procedure", the brightness values Bvd(i) (where i=0–5) corresponding to the photometry areas A0–A5 are compared with each other, or the brightness of the object as a whole is detected, and a condition of the object to be photographed (e.g., photographing with rear light, photographing at dusk, or photographing at night) is determined. Then, based on the determined condition, the brightness values Bvd(i) are weighted, or one of the brightness values Bvd(i) is selected and then the exposure value Lvd suitable to the photographing condition is determined. Then, based on the brightness values Bvd(i), parameters for calculating the exposure value Lvd are calculated at S131. Then, the upper brightness limit of a parameter is calculated (S132), compensation value for the rear light is calculated (S133), weighting parameters are calculated (S134), a photographing magnification M is checked (S135), a photographing scene is judged (S136), a positive compensation value for a high brightness photographing scene is calculated (S137), and the exposure value Lvd is calculated based on the calculated parameters and the brightness values Bvd(i) (S138).

FIG. 12 is a flowchart illustrating a "colorimetry procedure" called at S16 of the main procedure.

In the "colorimetry procedure", the color of the object is detected, and a colorimetric compensation value CC is calculated in accordance with the detected color of the object.

At S21, colorimetric parameters are initialized (i.e., set to initial values). Depending on the color temperature of a light source illuminating the object, the colorimetric value varies. At S22, a "light source compensation procedure" is executed to obtain compensation values for the effects of the color temperature of the light source. At S23, a "light source compensation procedure" is executed using the compensation values obtained at S22. At S24, a "colorimetric parameter calculation procedure" for obtaining colorimetric parameters, which will be used for execution of a "colorimetric calculation procedure", is executed. At S25, a "colorimetric constant setting procedure" is executed to set constants used for color measurement. At S26, a "color judgment procedure" for judging a color based on the parameters and constants obtained in the preceding steps is executed. At S27, an "area colorimetric compensation value calculating procedure" is executed for calculating colorimetric compensation values CC(i) for the photometry areas A0–A5 in accordance with the judged color. At S28, a CC calculating procedure for calculating a colorimetric compensation value CC for an entire object in accordance with the colorimetric compensation values CC(i) for the respective photometry areas is executed.

At S18 (see FIG. 7), the exposure value Lvd obtained at S15 is compensated based on the colorimetric compensation value CC as a whole to obtain a final exposure value Lvd. That is, the final exposure value Lvd is calculated by the formula below:

$$Lvd=Lvd+CC.$$

Next, steps S22–S28 shown in FIG. 12 will be described in further detail.

FIG. 13 is a flowchart illustrating the "light source compensation procedure" called at S22 of FIG. 12. In the embodiment, when the initial Bvd value of the photometry sensors 9 is determined, a predetermined light source (i.e., light source A) for adjustment is used. When a photographing is to be executed in practice, the Bvd should be compensated in accordance with the actually used light source, for example, the sun light. In the procedure shown in FIG. 13, relative compensation values of B (blue) and R (red) components with respect to the value for the green component are obtained.

Specifically, for the color components G, B and R, light source data Bvd·light·g, Bvd·light·b, Bvd·light·r is read form the EEPROM 26 of the controller 20 (S141). Then, a light source adjustment value adj·sun·b for the photometry sensor 9B and a light source adjustment value adj·sun·r for the photometry sensor 9R with respect to the value for G component are read from the EEPROM 26 (S142). In the embodiment, the light source adjustment values are as follows (S145).

$$adj·sun·b=+8$$

$$adj·sun·r=-4$$

It should be noted that, if the adjustment of the sensors 9 is executed using the sun light instead of the predetermined light source A, the light source adjustment values are all zero.

Then, based on the light source data and the light source adjustment values, a light source compensation value light·gb for the photometry sensor 9B is obtained as follows (S143).

$$light·gb=Bvd·light·g-Bvd·light·b+adj·sun·b$$

Similarly, a light source compensation value light·gr for the photometry sensor 9R is obtained as follows (S144).

$$light·gr=Bvd·light·g-Bvd·light·r+adj·sun·r$$

FIG. 14 is a flowchart illustrating the "light source difference compensation procedure", which is called at S23 in FIG. 12. In this procedure, based on the light source compensation values for B and R, obtained at S22, the light source compensation is applied to the brightness values Bvd·b(i) and Bvd·r(i) (i=0–5) obtained at areas A0–A5 of the photometry sensors 9B and 9R, respectively.

At S151, for each photometry area of the photometry sensor 9B, the following calculation is executed.

$$Bvd·b(i)=Bvd·b(i)+light·gb$$

At S152, for each photometry area of the photometry sensor 9R, the following calculation is executed.

$$Bvd·r(i)=Bvd·r(i)+light·gr$$

With the above compensation, the photometry sensors 9G, 9B and 9R has the same photometric characteristics for the sun light.

FIG. 15 is a flowchart illustrating the "colorimetric parameter calculation procedure", which is called at S24 of FIG. 12. In this procedure, colorimetric parameters used in the colorimetric judging are calculated. As the colorimetric parameters, parameters Gf(i) for G component, parameters Bf(i) for B component, and parameters Rf(i) for R component are calculated (S161, S162 and S163) according to the following formulae.

$$Gf(i)=Bvd·g(i)-\{Bvd·b(i)+Bvd·r(i)\}/2;$$

$$Bf(i)=Bvd·b(i)-\{Bvd·g(i)+Bvd·r(i)\}/2;$$

and $$Rf(i)=Bvd·r(i)-\{Bvd·b(i)+Bvd·g(i)\}/2.$$

As shown above, in the colorimetric parameter calculation procedure, a difference between output value of one of the RGB sensors 9R, 9G and 9B and the averaged output value of the other two of the sensors 9R, 9G and 9B is used as the colorimetric parameter. It should be noted that the thus obtained colorimetric parameter represents a mixing ratio, with respect to one of the RGB, of the other two colors. In other words, the colorimetric parameter represents the purity of the one of the colors R, G and B of the object. For example, with regard to Bf(i), if the values is large, mixed amounts of red and green components are small, and therefore, the blue purity of the object is relatively high. If Bf(i) is relatively small, relatively large amounts of the red and green components are included, even if the judged color is blue, and therefore, the blue purity is relatively small.

FIG. 16 is a flowchart illustrating the colorimetric constant setting procedure, in which the colorimetric constants are read from the EEPROM 26. The colorimetric constants include:

threshold values for color judgment: THvalue.*1(i);

coefficients for color judgment: coefficient·#1(i) and coefficient·#2(i);

coefficients for calculating colorimetric compensation values: CCcoefficient·*1(i);

adjustment values for calculating the colorimetric compensation values: CCadjustment·*1(i).

In the above indication, a symbol * represents g (green), b (blue), r (red), m (magenta), y (yellow) or c (cyan), and a symbol # represents g (green), b (blue) or r (red). In this procedure, for all the photometry areas A0–A5 of the sensors 9, the colorimetric constants are set, respectively. Therefore, at S171, i is set to zero (0), and then, if i≦5 (S172: YES), the constants are read from the EEPROM (S173, S174, S175 and S176). Then, at S177, i is incremented by one, and control returns to S172. Thus, for i=0 through 5, steps S173–S176 are repeated. The constants read from the EEPROM 26 are stored in the RAM 27 of the controller 20. FIG. 17 shows an example of the constants read from the EEPROM 26.

FIGS. 18 and 19 show a flowchart illustrating the "color judgment procedure". The procedure judges the color for each of the photometry areas A0–A5 of the photometry sensors 9G, 9B and 9R, and determines the color of the object for each photometry area A0–A5.

At S181, i is set to 0. Then, if i≦5 (S182: YES), the following steps are repeated. In the following description, Color(i) represents color parameters, Color·max(i) and Color·min(i) represent color judgment parameters, respectively.

At S183, the color parameter Color(i) is set to colorless. Then, at S184, Rf(i) and THvalue·c1(i) are compared.

If Rf(i)<THvalue·c1(i) (S184:YES), |Bf(i)−Gf(i)| and |coefficient·r1(i)×Rf(i)| are compared (S185).

If |Bf(i)−Gf(i)|<|coefficient·r1(i)×Rf(i)| (S185:YES), Color·min(i) is set to Rf(i) (S186).

If Rf(i)≧THvalue·c1(i) (S184:NO) or |Bf(i)−Gf(i)|≧|coefficient·r1(i)×Rf(i)| (S185:NO), step S186 is skipped.

At S187, Gf(i) is compared with THvalue·m1(i).

If Gf(i)<THvalue·m1(i) (S187:YES), |Bf(i)−Rf(i)| and |coefficient·g1(i)×Gf(i)| are compared (S188).

If |Bf(i)−Rf(i)|<|coefficient·g1(i)×Gf(i)| (S188:YES), Color·min(i) is set to Gf(i) (S189).

If Gf(i)>THvalue·m1(i) (S187:NO) or |Bf(i)−Rf(i)|≧|coefficient·g1(i)×Gf(i)| (S188:NO), step S189 is skipped.

At S190, Gf(i) is compared with THvalue·g1(i).

If Gf(i)>THvalue·g1(i) (S190:YES), |Bf(i)−Rf(i)| and |coefficient·g2(i)×Gf(i)| are compared (S191).

If |Bf(i)−Rf(i)|<|coefficient·g2(i)×Gf(i)| (S191:YES), Color·max(i) is set to Gf(i) (S192).

If Gf(i)≦THvalue·g1(i) (S190:NO) or |Bf(i)−Rf(i)|≧|coefficient·g2(i)×Gf(i)| (S191:NO), step S192 is skipped.

At S193, Bf(i) is compared with THvalue·b1(i).

If Bf(i)>THvalue·b1(i) (S193:YES), |Gf(i)−Rf(i)| and |coefficient·b2(i)×Bf(i)| are compared (S194).

If |Gf(i)−Rf(i)|<|coefficient·b2(i)×Bf(i)| (S194:YES), Color·max(i) is set to Bf(i) (S195). If Bf(i)≦THvalue·b1(i) (S193:NO) or |Gf(i)−Rf(i)|≧|coefficient·b2(i)×Bf(i)| (S194:NO), step S195 is skipped.

At S196, Rf(i) is compared with THvalue·r1(i).

If Rf(i)>THvalue·r1(i) (S196:YES), |Bf(i)−Gf(i)| and |coefficient·r2(i)×Rf(i)| are compared (S197).

If |Bf(i)−Gf(i)|<|coefficient·r2(i)×Rf(i)| (S197:YES), Color·max(i) is set to Rf(i) (S198). If Rf(i)≦THvalue·r1(i) (S196:NO) or |Bf(i)−Gf(i)|≧|coefficient·r2(i)×Rf(i)| (S197:NO), step S198 is skipped.

At S199, Bf(i) is compared with THvalue·y1(i).

If Bf(i)<THvalue·y1(i) (S199:YES), |Gf(i)−Rf(i)| and |coefficient·b1(i)×Bf(i)| are compared (S200).

If |Gf(i)−Rf(i)|<|coefficient·b1(i)×Bf(i)| (S200:YES), Color·min(i) is set to Bf(i) (S201). If Bf(i)>THvalue·y1(i) (S199:NO) or |Gf(i)−Rf(i)|≧|coefficient·b1(i)×Bf(i)| (S200:NO), step S201 is skipped.

During the above steps, for each of the photometry areas A0–A5, color·max(i) and color·min(i) are obtained.

At S202, color·min(i) and Rf(i) are compared. If color·min(i) is equal to Rf(i) (S202:YES), color(i) is set to cyan (S203). If color·min(i) is not equal to Rf(i), color·min(i) and Gf(i) are compared at S204. If color·min(i) is equal to Gf(i) (S204:YES), color(i) is set to magenta (S205). If color·min(i) is not equal to Gf(i), color·max(i) and Gf(i) are compared at S206. If color·max(i) is equal to Gf(i) (S206:YES), color(i) is set to green (S207). If color·max(i) is not equal to Gf(i) (S206:NO), then color·max(i) and Bf(i) are compared at S208. If color·max(i) is equal to Bf(i), color(i) is set to blue (S209). If color·max(i) is not equal to Bf(i) (S208:NO), then color·max(i) is compared with Rf(i) at S210. If color·max(i) is equal to Rf(i) (S210:YES), then color(i) is set to red (S211). If color·max(i) is not equal to Rf(i) (S210:NO), then color·min(i) is compared with Bf(i) at S212. If color·min(i) is equal to Bf(i) (S212:YES), color(i) is set to yellow (S213), and control proceeds to S214. If color·min(i) is not equal to Bf(i) (S212:NO), step S213 is skipped, and control proceeds to S214, where i is incremented by one. Then, control proceeds to S182. As a result of the above-described procedure, Yellow has the highest priority, and in the foregoing steps, the color finally selected in accordance with the conditions is determined as the color of the photometry area.

FIG. 20 is a flowchart illustrating an example of the "area colorimetric compensation value calculating procedure", which is called at S27 of the main colorimetry procedure in FIG. 12.

In this procedure, the colorimetric compensation values CC(i) corresponding to the difference of the color among the photometry areas are calculated. In the example shown in FIG. 20, the compensation values CC(i) are determined by selecting values from among predetermined values.

At S221, i is set to an initial value of zero. At S222, it is judged whether i is smaller than five. If i is 0, 1, 2, 3, 4 or 5, (S222:YES), it is judged whether color (i) is colorless (S223). If color(i) is colorless (S223:YES), CC(i) is set to zero (S224). If:.color(i) is not colorless (S223:NO), step S224 is skipped. At S225, it is judged whether color(i) is cyan. If color(i) is cyan (S225:YES), CC(i) is calculated using the following formula (S226).

$$CC(i)=CC\text{coefficient·}c1(i)\times(Rf(i)-TH\text{value·}c1(i))+CC\text{adjustment·}c1(i)$$

If color(i) is not cyan (S225:NO), then step S226 is skipped. At S227, it is judged whether color(i) is magenta. If color(i) is magenta (S227:YES), CC(i) is calculated using the following formula (S228).

$$CC(i)=CC\text{coefficient·}m1(i)\times(Gf(i)-TH\text{value·}m1(i))+CC\text{adjustment·}m1(i)$$

If color(i) is not magenta (S227:NO), then step S228 is skipped. At S229, it is judged whether color(i) is green. If color(i) is green (S229:YES), CC(i) is calculated using the following formula (S230)

$$CC(i)=CC\text{coefficient·}g1(i)\times(Gf(i)-TH\text{value·}g1(i))+CC\text{adjustment·}g1(i)$$

If color(i) is not green (S229:NO), then step S230 is skipped. At S231, it is judged whether color(i) is blue. If color(i) is blue (S231:YES), CC(i) is calculated using the following formula (S232).

$$CC(i)=CC\text{coefficient·}b1(i)\times(Bf(i)-TH\text{value·}b1(i))+CC\text{adjustment·}b1(i)$$

If color(i) is not blue (S231:NO), then step S232 is skipped. At S233, it is judged whether color(i) is red. If color(i) is red (S233:YES), CC(i) is calculated using the following formula (S234).

$$CC(i)=CC\text{coefficient·}r1(i)\times(Rf(i)-TH\text{value·}r1(i))+CC\text{adjustment·}r1(i)$$

If color(i) is not red (S233:NO), then step S234 is skipped. At S235, it is judged whether color(i) is yellow. If color(i) is yellow (S235:YES), CC(i) is calculated using the following formula (S236).

$$CC(i)=CC\text{coefficient·}y1(i)\times(Bf(i)-TH\text{value·}y1(i))+CC\text{adjustment·}y1(i)$$

If color(i) is not yellow (S235:NO), then step S236 is skipped. Then, at S237, i is incremented by one, and control returns to S222 (i.e., the above steps are repeated for i=0–5).

As a result, the colorimetric compensation values CC(i) for the photometry areas A0–A5 are calculated, respectively.

As described above, when the colorimetric compensation values CC(i) are calculated, the colorimetric parameters Gf(i), Rf(i) and Bf(i) obtained in the colorimetric parameter calculation procedure (FIG. 15) are included in the formulae for obtaining the colorimetric compensation values CC(i). Therefore, if the value of a colorimetric parameter is large, the colorimetric compensation value CC(i) is also large. For example, if the colorimetric parameter Bf(i) is relatively large, the blue color purity is relatively large. In such a case, in the colorimetric compensation value determining procedure, the colorimetric compensation value CC(i) is calculated to have a large value in comparison to a case where relatively large amount of red and/or green components are included in the light from the object. Thus, in this example, appropriate exposure compensation value can be obtained taking the blue color purity into account. Therefore, reliable exposure compensation can be achieved according to the above-described procedures.

Then, in the CC calculation procedure at S28 (see FIG. 12), a colorimetric compensation value CC is calculated based on the colorimetric compensation values CC(i). In this procedure, the colorimetric compensation value CC is calculated by averaging or weight-averaging the colorimetric compensation values CC(i) (i=1, 2, ... 5).

Alternatively, only the value corresponding to the central area A0 may be used. In this case, the colorimetrymay be performed only for the central area A0. Further alternatively, the colorimetry may be performed for an area corresponding to a distance measuring point. In such a case, the area for which the colorimetry is performed may be selected in accordance with focusing area information obtained from the distance measuring device. In these cases, since it is not necessary to perform the colorimetry for all the areas A0–A5, the number of areas for which the colorimetry is performed can be reduced.

By compensating the exposure value Lvd using the thus obtained colorimetric compensation value CC, an appropriate exposure can be performed for entire object.

In the first embodiment, further to the above, the exposure compensation value is compensated in accordance with the contrast of the object. As mentioned above, depending on the contrast of the object, the colorimetry compensation value CC may not be appropriate. Therefore, as described below, the exposure compensation value is compensated in accordance with the contrast of the object. Specifically, when the contrast is relatively large, the exposure compensation value is lowered.

FIG. 21 is a flowchart illustrating a colorimetry compensation value compensating procedure, which is called at S17 of FIG. 7.

At S241, a photometry contrast value Bv·con is calculated in accordance with the formula below:

$$Bv \cdot con = \{ \max(Bvd(i)) - \min(Bvd(i)) \},$$

where, Bvd(i) represents brightness values obtained in the exposure value calculation procedure, and max(Bvd(i)) and min(Bvd(i)) represent maximum and minimum values of the brightness values, respectively. It should be noted that i ranges from 0 to 5, which correspond to areas A0–A5. In order to avoid the affect of contrast at the peripheral portion of the object in a photographing frame, in the above calculation, i may range from 0 to 4 so that the peripheral area A5 is neglected, or weighting less than 1 is applied to the values corresponding to peripheral areas (e.g., area A5).

At S242, in order to lower the compensation value CC if the contrast of the object is greater, a contrast compensation value Bv·con·k is calculated as follows:

$$Bv \cdot con \cdot k = \{1 - (Bv \cdot con/8)\}.$$

It should be noted that the divisor "8" is an empirically determined value, and may be modified appropriately.

At S243, it is judged whether Bv·con·k is negative. If Bv·con·k is negative (S243: YES), Bv·con·k is set to zero (S243). If Bv·con·k is equal to or greater than zero, it is used as the contrast compensation value as it is.

At S245, using the contrast compensating value Bv·con·k, the colorimetry compensation value CC is compensated in accordance with the formula below.

$$CC = Bv \cdot con \cdot k \times CC.$$

Then, using the thus obtained (i.e., compensated) colorimetry compensation value CC, the exposure value Lvd is compensated (S18 in FIG. 7) in accordance with the formula below.

$$Lvd = Lvd + CC.$$

Since the exposure value Lvd is compensated as described above, an appropriate exposure can be determined regardless of the contrast of the object. In particular, when the photometry contrast value is large, the contrast compensation value Bv·con·k is set to a relatively small value. As a result, the colorimetry compensation value CC is made small. Accordingly, when the contrast of the object is large, and the exposure compensation value is determined, based on a portion having a low reflectivity, such that the object is over-exposed, the degree of over-exposed condition can be suppressed. Therefore, the portion having a relatively high reflectivity will not be excessively over-exposed. On the contrary, if the contrast of the object is relatively low, the degree of compensation applied to the colorimetric compensation value CC is relatively small, and therefore, an appropriate exposure value corresponding to the color of the object can be determined.

If the distance measuring device 8 selects point P0 (see FIG. 4B) as a distance measuring point, and focusing is performed to focus on point P0, by determining the contrast between the area A0, which includes point P0, and the adjacent areas A1–A4 or A1–A5, the focused portion of the object and the vicinity thereof can be exposed appropriately.

Figure 3B:
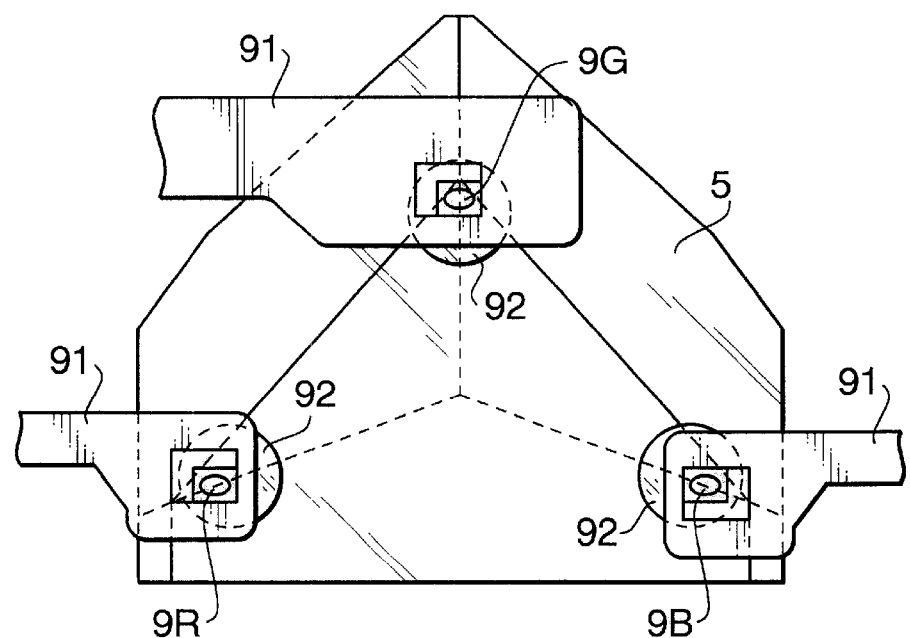
FIG. 3B shows an alternative arrangement of photometry sensors.

In the embodiment described above, the sensor 9D for the normal light is provided in addition to the sensors 9B, 9G and 9R for B, G and R color components. The light receiving characteristics of the sensor G has a peak at the wavelength of 540 nm. This characteristic is close to that of the sensor 9D. Therefore, the sensor 9G is used instead of the sensor 9D, and the sensor 9D is omitted, as shown in FIG. 3B. In such a case, in steps S11–S15 of the main procedure (FIG. 7), the output Bvad·g of the sensor 9G is used as Bvad, and the calculation is to be executed.

With such a structure, since the number of the sensors is reduced, the manufacturing cost can be reduced. Further, a space necessary for arranging the sensors can be reduced, which enables downsizing of the camera body. In the case of FIG. 3B, since the sensor 9G is arranged at the upper central portion on the eyepiece optical system side of the pentagonal prism, photometry can be done accurately.

Second Embodiment

An operation of a photometry device according to a second embodiment will be described hereinafter.

The structure of the photometry device according to the second embodiment is similar to that of the first embodiment. In the second embodiment, the operation according to the first embodiment is modified.

FIG. 22 is a flowchart illustrating a main procedure of the photometry operation according to the second embodiment.

The procedure is substantially identical to that shown in FIG. 7 except that S17 is replaced with S17A. At S17A, the colorimetric compensation value CC is further compensated.

FIG. 23 shows a flowchart illustrating a colorimetric compensation value compensating procedure, which is called at S17A of FIG. 22, according to the second embodiment.

At S251, a brightness value Bvα of one of the photometry areas A0–A4 of the normal light photometry sensor 9D is selected and a brightness value Bvβ of one of the areas A0–A4 surrounding the selected area are compared, and the difference therebetween is referred to as a photometry contrast value Bv·cont. If, for example, the area A0 is selected, the brightness value Bvα of the area A0 and the brightness value Bvβ of one of the areas A1–A4 surrounding the area A0 are compared and the difference therebetween is calculated. In such a case, the brightness value Bvβ may be determined as an average of brightness values for areas A1–A4.

In S252, it is judged whether Bv·cont is greater than 10. If Bv·cont is greater than 10 (S252: YES), it is judged whether the color of the selected area (e.g., A0) is red. In the following description, for the sake of simplicity, it is assumed that the area A0 is selected, and the color of the area A0 will be indicated by Color(0). It should be noted that Color(0) has been judged at the procedure shown in FIG. 19.

If the color of area A0 (i.e., Color(0)) is red (S253: YES), the colorimetric compensation value CC is set to zero (S254). If Bv·cont is equal to or smaller than 10 (S252: NO) or if Color(0) is not red (S253: NO), step S254 is skipped.

Next, in S255, it is judged whether the photometry brightness value Bv·cont is greater than 12. If Bv·cont is greater than 12 (S255: YES), it is judged whether the Color(0) is blue (S256). If the color of area A0 (i.e., Color(0)) is blue (S256: YES), the colorimetric compensation value CC is set to 0 (S257). If Bv·cont is equal to or smaller than 12 (S255: NO) or if Color(0) is not blue (S256: NO), step S257 is skipped.

Further, in S258, it is judged whether the photometry brightness value Bv·cont is smaller than −12. If Bv·cont is smaller than −12 (S258: YES), it is judged whether the Color(0) is yellow (S259). If the color of area A0 (i.e., Color(0)) is yellow (S259: YES), the colorimetric compensation value CC is set to 0 (S260). If Bv cont is equal to or greater than −12 (S258: NO) or if Color(0) is not yellow (S259: NO), step S260 is skipped.

As above, if the brightness of a certain area (e.g., area A0, in the above description) is relatively large or relatively small with respect to the brightness of the surrounding areas, i.e., when the absolute value of the contrast therebetween is relatively large, and the color of the area is red, blue or yellow, the colorimetric compensation value CC is set to 0, so that the compensation of the exposure value Lvd using the colorimetric compensation value CC is not performed in the exposure value compensation procedure (see S18 of FIG. 22). In the other cases, the colorimetric compensation value CC is not compensated (i.e., is not set to 0) in the procedure shown in FIG. 23, and the exposure value Lvd is compensated based on the colorimetric compensation value CC.

According to the colorimetric compensation value compensating procedure shown in FIG. 23, when the contrast between a portion (e.g., A0) and the surrounding portion of the object is relatively large, compensation of the exposure value using the colorimetric compensation value CC is not performed. Accordingly, it is prevented that a reflectivity of an area affects in determining exposure value with respect to the adjacent area and each portion of the object can be photographed at appropriately exposed condition. It should be noted that, according to the second embodiment, the reason why the compensation is not done when the contrast is relatively large is that, when the contrast is relatively large, it is assumed that an area and adjacent area may have different colors.

Similarly to the first embodiment, if the distance measuring device 8 selects, for example, point P0 (see FIG. 4B) as a distance measuring point and focusing is performed to focus on point P0, by determining the contrast between the area A0, which includes point P0, and the adjacent areas A1–A4 or A1–A5, the focused portion of the object and the vicinity thereof can be exposed appropriately.

Further, if the colorimetry is performed with respect to only a predetermined area, for example, area A0 (see FIG. 4B), and necessity of compensation is judged by the contrast between the predetermined area and the surrounding areas, it becomes unnecessary that each colorimetry sensor is configured to have divided colorimetry areas. If such a configuration is employed, therefore, it becomes unnecessary to use relatively expensive sensors for the colorimetry sensors.

In the second embodiment described above, similarly to the first embodiment, the sensor 9G can be used instead of the sensor 9D, and the sensor 9D is omitted, as shown in FIG. 3B.

The present disclosure relates to the subject matters contained in Japanese Patent Applications Nos. 2000-40055 and 2000-40056, both filed on Feb. 17, 2000, No. 2000-235357, filed on August 3, and No. 2000-239413, filed on Aug. 8, 2000, which are expressly incorporated herein by reference in their entirety.

What is claimed is:

1. A photometry device for a camera, comprising:

a normal light sensor that has spectral sensitivity characteristics close to visual sensitivity characteristics, said normal light sensor having a light metering surface divided into a plurality of photometry areas;

a plurality of colorimetric sensors that have spectral sensitivity characteristics different from each other;

an exposure amount determining system that determines an exposure amount of an object in accordance with an output signal of said normal light sensor;

a colorimetry system that determines a color of the object in accordance with output signals of said plurality of colorimetric sensors; and a compensation amount determining system that determines an exposure compensation amount in accordance with the color determined by said colorimetry system, said compensation amount determining system obtaining a difference between a maximum output and a minimum output of the outputs of said plurality of photometry areas of said normal light sensor as a contrast value, said exposure compensation amount being compensated in accordance with the contrast value, wherein said compensation amount determining system compensates for the exposure compensation amount in accordance with output differences among said plurality of colorimetric sensors.

2. The photometry device according to claim 1, wherein said compensation amount determining system compensates for the exposure compensation amount, such that the exposure compensation amount is made greater when said differences are greater.

3. The photometry device according to claim 1,
wherein said normal light sensor includes a normal light photometry sensor with a spectral sensitivity characteristic having a peak sensitivity at a wavelength within a range from approximately 500 nm through 600 nm, and
wherein said plurality of colorimetric sensors include a blue light photometry sensor that meters a blue light component, a green light photometry sensor that meters a green light component, and a red light photometry sensor that meters a red light component.

4. The photometry device according to claim 3, wherein said green light sensor further functions as said normal light sensor.

5. The photometry device according to claim 1, wherein said compensation amount determining system calculates a difference between an output of one of said plurality of colorimetric sensors, and an average of outputs of the others of said plurality of colorimetric sensors, and wherein said compensation amount determining system compensates the exposure compensation amount in accordance with the difference.

6. The photometry device according to claim 5, wherein said compensation amount determining system compensates for the exposure compensation amount such that said exposure compensation amount becomes larger as the difference becomes greater.

7. The photometry device according to claim 1, wherein each of said plurality of colorimetric sensors has a light metering surface divided into a plurality of photometry areas, and wherein said compensation amount determining system determines the exposure compensation amount in accordance with the output of at least one of said plurality of photometry areas.

8. The photometry device according to claim 7, wherein said at least one of said plurality of photometry areas includes a center of an object subjected to be metered.

9. The photometry device according to claim 7, wherein said at least one of said plurality of photometry areas overlaps an area subjected to a distance measuring.

10. The photometry device according to claim 1, wherein said compensation amount determining system compensates for the exposure compensation amount such that said exposure compensation amount becomes smaller as the contrast value becomes larger.

11. A photometry device for a camera, comprising:
a photometry system that divides a photographing area into a plurality of photometry areas and performs a photometry operation with respect to each of said plurality of photometry areas;
a colorimetry system that performs a colorimetry operation with respect to at least one of said plurality of photometry areas;
an exposure amount determining system that determines an exposure amount of an object in accordance with outputs of said photometry system;
an exposure compensation amount determining system that determines a color of the object in accordance with an output of said colorimetry system, and determines an exposure compensation amount in accordance with the determined color; and
an exposure compensation amount compensating system that compensates for the exposure compensation amount in accordance with the determined color and a difference between an output of said photometry system corresponding to said at least one of said photometry areas for which the colorimetry operation is performed and outputs of said photometry system corresponding to photometry areas proximate said at least one of said photometry areas.

12. The photometry device according to claim 11, wherein said at least one of said plurality of photometry areas includes a photometry area corresponding to a center of said photographing area.

13. The photometry device according to claim 11, wherein said at least one of said plurality of photometry areas includes a point subjected to a distance measuring for focusing.

14. The photometry device according to claim 11, wherein said exposure compensation amount compensating system lowers said exposure compensation amount when the determined color comprises a color having a high reflectivity, and the output of said photometry areas proximate said at least one photometry area is low relative to the output of said at least one photometry area.

15. The photometry device according to claim 11, wherein said exposure compensation amount is set to zero by said exposure compensation amount compensating system when the determined color is a color having a high reflectivity, and the output of said photometry areas proximate said at least one photometry area is low relative to the output of said at least one photometry area.

16. The photometry device according to claim 11, wherein said exposure compensation amount compensating system lowers said exposure compensation amount when the determined color is a color having a low reflectivity, and the output of said photometry areas proximate said at least one photometry area is high relative to the output of said at least one photometry area.

17. The photometry device according to claim 11, wherein said exposure compensation amount is set to zero by said exposure compensation amount compensating system when the determined color is a color having a low reflectivity, and when the output of said photometry areas proximate said at least one photometry area is high relative to the output of said at least one photometry area.

18. The photometry device according to claim 11, wherein said exposure compensation amount is set to zero by said exposure compensation amount compensating system when the determined color is red, and a difference between the output of said photometry areas proximate said at least one photometry area, and the output of said at least one photometry area is greater than a first predetermined value.

19. The photometry device according to claim 18, wherein said exposure compensation amount is set to zero by said exposure compensation amount compensating system when the determined color is blue, and the difference between the output of said photometry areas proximate said at least one photometry area and the output of said at least one photometry area is greater than a second predetermined value, the second predetermined value being greater than the first predetermined value.

20. The photometry device according to claim 19, wherein said exposure compensation amount is set to zero by said exposure compensation amount compensating system when the determined color is yellow, and the difference between the output of said photometry areas proximate said at least one photometry area and the output of said at least one photometry area is smaller than a third predetermined value, the third predetermined value being smaller than the first predetermined value.

21. The photometry device according to claim 11,
wherein said photometry system includes a normal photometry sensor with a spectral sensitivity characteristic having a peak sensitivity at a wavelength within a range from approximately 500 nm through 600 nm, and wherein said colorimetry system includes a blue light photometry sensor that meters a blue light component, a green light photometry sensor that meters a green light component, and a red light photometry sensor that meters a red light component.

22. The photometry device according to claim 21, wherein said green light photometry sensor further functions as said normal photometry sensor.

23. A photometry device for a camera, comprising:

a photometry system that divides a photographing area into a plurality of photometry areas and performs a photometry operation with respect to each of said plurality of photometry areas;

a colorimetry system that divides a photographing area into a plurality of areas and performs a colorimetry operation with respect to at least one of said plurality of areas;

an exposure amount determining system that determines an exposure amount of an object in accordance with outputs of said photometry system;

an exposure compensation amount determining system that determines a color of the object in accordance with the output of said colorimetry system and determines an exposure compensation amount in accordance with the determined color; and an exposure compensation amount compensating system that compensates for the exposure compensation amount in accordance with differences among outputs of said photometry system, wherein said compensation amount compensating system compensates for said exposure compensation amount in accordance with a contrast value, said contrast value representing a difference between a maximum output and a minimum output of said photometry system.

24. The photometry device according to claim 23, wherein said compensation amount compensating system compensates for the exposure compensation amount such that the exposure compensation amount becomes smaller as the differences become greater.

25. The photometry device according to claim 23, wherein said compensation amount compensating system compensates for the exposure compensation amount such that the exposure compensation amount becomes smaller as the contrast value becomes greater.

26. The photometry device according to claim 23, wherein said photometry system includes a normal photometry sensor with a spectral sensitivity characteristic having a peak sensitivity at a wavelength within a range from approximately 500 nm through 600 nm, and wherein said colorimetry system includes a blue light photometry sensor that meters ablue light component, a green light photometry sensor that meters a green light component, and a red light photometry sensor that meters a red light component.

27. The photometry device according to claim 26, wherein said green light photometry sensor further functions as said normal photometry sensor.

\* \* \* \* \*